United States Patent [19]
Nishimura

[11] Patent Number: 5,926,163
[45] Date of Patent: Jul. 20, 1999

[54] IMAGE INPUT DEVICE USING TABLET

[75] Inventor: Tomohiko Nishimura, Yamatokouriyama, Japan

[73] Assignee: Sharp Kabushiki Kaisha, Osaka, Japan

[21] Appl. No.: 08/580,355

[22] Filed: Dec. 28, 1995

[30] Foreign Application Priority Data

Dec. 28, 1994 [JP] Japan .................................. 6-328126

[51] Int. Cl.⁶ ................................................. G09G 3/36
[52] U.S. Cl. ........................................... 345/104; 345/173
[58] Field of Search ............................. 345/173, 87, 90, 345/104, 179, 174

[56] References Cited

U.S. PATENT DOCUMENTS

| | | | |
|---|---|---|---|
| 5,410,329 | 4/1995 | Tagawa et al. | 345/104 |
| 5,420,704 | 5/1995 | Winkelman | 358/518 |
| 5,442,373 | 8/1995 | Nomura et al. | 345/104 |
| 5,606,346 | 2/1997 | Kai et al. | 345/173 |
| 5,631,666 | 5/1997 | Tagawa et al. | 345/174 |

FOREIGN PATENT DOCUMENTS 62-135966  6/1987  Japan .
5-53726    3/1993  Japan .

*Primary Examiner*—Richard A. Hjerpe
*Assistant Examiner*—Kent Chang

[57] ABSTRACT

In a tablet device incorporating a combined display and input, in order to correct a deviation between a position recognized by the device and a position indicated by the user caused by an arrangement of external electrodes outside an indication range, the indication range is divided into a plurality of correction regions, and different corrections are carried out in the respective regions. More specifically, in a region in which detected coordinates deviate, in the vicinity of a portion where scan electrodes converge on driver IC, a position in the x axis direction having the largest deviation is set as coordinates $X(1)$ to $X(M-1)$. These coordinates are used as boundary coordinates of a correction region in the x axis direction. On the other hand, boundary coordinates $\pm Y(1)$ to $\pm Y(N)$ in the y axis direction are set according to the distances from driver ICs. Correction expressions in the respective regions of 1-(1) to N-(M) and 1'-(1) to N'-(M) defined by the boundary coordinates in the x and y axis directions are stored in a memory. Coordinates (x, y) detected by the user indicating the indication range by a pen or the like are corrected according to the correction expressions stored corresponding to the respective regions including the coordinates.

16 Claims, 22 Drawing Sheets

IMAGE INPUT DEVICE USING TABLET

BACKGROUND OF THE INVENTION

1. Field of the Invention

The present invention relates to image input devices, and more particularly, to an image input device such as a tablet device incorporating a combined display and input used for a personal computer, a word processor, and the like.

2. Description of the Background Art

As a means for inputting a written character and a diagram in a computer, a word processor, and the like, a tablet device incorporating a combined display and input is disclosed in Japanese Patent Laying-Open No. 62-135966. This tablet device is formed of a liquid crystal display and an electrostatic induction type tablet stacked on each other, for example. This tablet device enables input of a character and a diagram in the electrostatic induction type tablet as if the character and the diagram were written on a piece of paper with a writing tool. However, in the tablet device incorporating a combined display and input, a grid-like electrode pattern is observed on a display screen due to differences in reflectance and transmittance of light between a portion including electrodes and a portion not including electrodes in the tablet, thereby degrading the quality of the liquid crystal display.

As a tablet overcoming such a shortcoming, a tablet device incorporating a combined display and input shown in FIG. 19 is disclosed in Japanese Patent Laying-Open No. 5-53726.

This tablet device has an electrode serving both as a display electrode of the liquid crystal display and as a coordinates detection electrode of the electrostatic induction type tablet. As shown in FIG. 20, a coordinates detection period for detecting indicated coordinates on the tablet and a display period for displaying an image are provided in a processing time for one frame, to carry out coordinates detection and image display in a time division manner. The coordinates detection period includes an x-coordinate detection period for detecting an x value of the coordinates and a y-coordinate detection period for detecting a y value of the coordinates.

Referring to FIG. 19, the tablet device incorporating a combined display and input includes a liquid crystal panel 1 having liquid crystal sealed between common electrodes and segment electrodes arranged orthogonally, a common driving circuit 2 for driving the common electrodes, a segment driving circuit 3 for driving the segment electrodes, a switching circuit 4 for carrying out switching between display control and detection control, a display control circuit 5 for carrying out display control of an image, a detection control circuit 6 for detecting indicated coordinates, a control circuit 7 for controlling display control circuit 5, detection control circuit 6, and the like, a detection pen 8 for inputting coordinates data by indicating an arbitrary point on liquid crystal panel 1, an amplifier 9 for amplifying a signal from detection pen 8, an x-coordinate detecting circuit 10 for detecting the x value of the coordinates based on the signal amplified by amplifier 9, a y-coordinate detecting circuit 11 for detecting the y value of the coordinates based on the signal amplified by amplifier 9, and a d.c. power supply circuit 12 for supplying current to the circuits.

Liquid crystal panel 1 is formed of common electrodes $Y_1$ to $Y_n$ (in the following description, an arbitrary common electrode is indicated as Y) and segment electrodes $X_1$ to $X_m$ (in the following description, an arbitrary segment electrode is indicated as X) arranged orthogonally to each other with liquid crystal sealed therebetween. Each pixel is formed in a region where each common electrode Y and each segment electrode X cross each other. More specifically, liquid crystal panel 1 includes pixels of n×m dots arranged in a matrix manner.

This tablet device incorporating a combined display and input has an advantage of suppressing appearance of the grid-like electrode pattern on the display screen to offer a more comfortable liquid crystal display as compared to the device formed by stacking the electrostatic induction type tablet on the liquid crystal display. Further, since the liquid crystal display and the electrostatic induction type tablet can share many electrodes and driving circuits, the tablet device has an advantage of easily reducing cost, and size and weight.

The tablet device incorporating display and input combined shown in FIG. 19 operates as follows. Common driving circuit 2 for driving common electrode Y and segment driving circuit 3 for driving segment electrode X are connected to display control circuit 5 and detection control circuit 6 through switching circuit 4. Switching circuit 4 is controlled by control circuit 7, and provides an output signal from display control circuit 5 to common driving circuit 2 and segment driving circuit 3 in the display period. On the other hand, switching circuit 4 provides an output signal from detection control circuit 6 to common driving circuit 2 and segment driving circuit 3 in the coordinates detection period.

In the display period, shift data s, an inverting signal fr, a clock signal cp1, a clock signal cp2, and display data D0 to D3 are output from a shift data output terminal S, an inverting signal output terminal FR, a clock output terminal CP1, a clock output terminal CP2, and data output terminals D0 to D3 of display control circuit 5, respectively.

Clock signal cp1 whose cycle is a period for displaying pixels for one line is applied to a clock signal input terminal YCK of common driving circuit 2 and a latch pulse input terminal XLP of segment driving circuit 3 through an output terminal CP1O of switching circuit 4 as a clock signal cp1o. Shift data s, which is a pulse signal for selecting a particular common electrode Y, is applied to a shift data input terminal DIO1 of common driving circuit 2 through an output terminal SO of switching circuit 4 as shift data so in synchronism with clock signal cp1o.

When shift data so is applied to common driving circuit 2, the pulse position of shift data so is shifted by shift registers in synchronism with clock signal cp1o. A driving pulse of a common electrode drive signal is applied to common electrodes $Y_1$ to $Y_n$ of liquid crystal panel 1 from output terminals O1 to On of common driving circuit 2 corresponding to the shifted position. The common electrode drive signal is generated based on bias power sources $V_0$ to $V_5$ supplied from d.c. power supply circuit 12.

Clock signal cp2 has a cycle corresponding to a period obtained by dividing the period for displaying pixels for one line into plural periods. Clock signal cp2 is applied to a clock input terminal XCK of segment driving circuit 3 through an output terminal CP2O of switching circuit 4 as a clock signal cp2o.

Display data $D_0$ to $D_3$ are applied to input terminals XD0 to XD3 of segment driving circuit 3 through output terminals D0O to D3O of switching circuit 4 as display data $D_0o$ to $D_3o$, and sequentially input in registers in segment driving circuit 3 in synchronism with clock signal cp2o. When display data corresponding to pixels for one line are all input, the input display data are latched at a timing of clock signal cp1o which is applied to latch pulse input terminal XLP, and the driving pulse of the segment electrode drive signal corresponding to each display data is applied to segment electrodes $X_1$ to $X_m$ of liquid crystal panel 1 from output terminals O1 to Om of segment driving circuit 3. This segment electrode drive signal is also generated based on bias power sources $V_0$ to $V_5$ supplied from d.c. power supply circuit 12.

Note that inverting signal fr prevents degradation of a liquid crystal due to electrolysis by periodically inverting the direction of voltage application to the liquid crystal in the display period. Inverting signal fr is applied to an inverting signal input terminal YFR of common driving circuit 2 and an inverting signal input terminal XFR of segment driving circuit 3 through an inverting signal output terminal FRO of switching circuit 4 as an inverting signal fro.

The pixel matrix of liquid crystal panel 1 is driven by the operation of common driving circuit 2 and segment driving circuit 3 according to the line order, and an image corresponding to display data $D_0$ to $D_3$ is displayed on liquid crystal panel 1.

On the other hand, during the coordinates detection period, shift data sd, an inverting signal frd, a clock signal cp1$d$, a clock signal cp2$d$, and drive data $D_0d$ to $D_3d$ are output from a shift data output terminal Sd, an inverting signal output terminal FRd, a clock output terminal CP1$d$, a clock output terminal CP2$d$, and data output terminals D0$d$ to D3$d$ of detection control circuit 6, respectively.

Clock signal cp1 has a cycle corresponding to a scanning period for scanning one common electrode Y. Clock signal cp1 is applied to clock input terminal YCK of common driving circuit 2 and latch pulse input terminal XLP of segment driving circuit 3 through output terminal CP1O of switching circuit 4 as clock signal cp1o. Shift data sd which is a pulse signal for selecting a particular common electrode Y is applied to shift data input terminal DIO1 of common driving circuit 2 through output terminal SO of switching circuit 4 as shift data so in synchronism with clock signal cp1d.

Similar to the case of the above described display period, the pulse position of shift data so is shifted by shift registers included in common driving circuit 2 in synchronism with clock signal cp1o, and scanning pulses of common electrode scan signals $y_1$ to $Y_n$ (in the following description, an arbitrary common electrode scan signal is indicated as y) are sequentially applied to common electrodes $Y_1$ to $Y_n$ from output terminals O1 to On corresponding to the shifted position. This common electrode scan signal y is generated based on bias power sources $V_0$ to $V_5$ supplied from d.c. power supply circuit 12.

Clock signal cp2$d$ has a cycle corresponding to a scanning period for scanning segment electrode X. Clock signal cp2$d$ is applied to clock input terminal XCK of segment driving circuit 3 through output terminal CP2O of switching circuit 4 as clock signal cp2o.

Drive data $D_0d$ to $D_3d$ are applied to input terminals XD0 to XD3 of segment driving circuit 3 through output terminals D0O to D3O of switching circuit 4 as drive data $D_0o$ to $D_3o$, and sequentially input in registers in segment driving circuit 3 in synchronism with clock signal cp2o. Scanning pulses of segment electrode scan signals $x_1$ to $x_m$ (in the following description, an arbitrary segment electrode scan signal is indicated as x) corresponding to the above described drive data are output from output terminals O1 to Om of segment driving circuit 3 to segment electrodes $X_1$ to $X_m$. This segment electrode scan signal x is also generated based on bias power sources $V_0$ to $V_5$ supplied from d.c. power supply circuit 12.

FIG. 21 is a timing chart of the respective scan signals in the coordinates detection period of the tablet device incorporating the combined display and input device of FIG. 19.

The coordinates detection period is divided into the x-coordinate detection period and the y-coordinate detection period following thereto. During the x-coordinate detection period, segment electrode scan signal x which is a pulse voltage signal is sequentially applied to segment electrode X. On the other hand, in the y-coordinate detection period, common electrode scan signal y, which is a pulse voltage signal, is sequentially applied to common electrode Y.

By application of the pulse voltage signal, a voltage is induced in detection pen 8 by stray capacitance between segment electrode X or common electrode Y and a tip electrode of detection pen (indicated coordinates detection pen) 8. The induced voltage generated in detection pen 8 is amplified by amplifier 9, and then applied to x-coordinate detecting circuit 10 and y-coordinate detecting circuit 11.

Based on an output signal from amplifier 9 and a timing signal from control circuit 7, x-coordinate detecting circuit 10 and y-coordinate detecting circuit 11 detect the x value of the coordinates or the y value of the coordinates of the position indicated by detection pen 8 by detection of a time period from application of the pulse voltage signal to the induced voltage attaining the maximum value.

However, the above described tablet device incorporating a combined display and input has the following problems.

FIG. 22 shows the problems in the conventional tablet device incorporating a combined display and input.

In the graph of FIG. 22, the abscissa represents an actual x value of the coordinates indicated by the detection pen, and the ordinate represents a detected x value of the coordinates.

It is desired that the indicated x value of the coordinates and the detected x value of the coordinates have a linear relationship as shown by the dotted line. However, in portions proximate to upper and lower ends of the liquid crystal panel, the indicated x value of the coordinates and the detected x value of the coordinates have a relationship of a curve having a periodic vibration as shown by the solid line. The amplitude of the vibration becomes larger as the detected coordinates approaches the upper and lower ends of the liquid crystal panel.

More specifically, in the portions proximate to the upper and lower ends of the screen, an accurate detected coordinates value cannot be obtained.

FIG. 26 shows display when straight line images are input at an equal interval in the longitudinal direction by the detection pen in the conventional tablet device incorporating a combined display and input.

As shown in the figure, even if a diagram actually input is a straight line, a periodic error is produced in the detected x value of the coordinates in the vicinity of an end portion 100 on the screen as described above. The error becomes larger as the straight line approaches end portion 100 of the screen. Positions P1 to P5 of the x value of the coordinates in which the error is produced in FIG. 26 corresponded to positions P1 to P5 of FIG. 22, respectively.

The error is produced by the following reason. As shown in FIG. 23, scan electrodes (in this case, segment electrodes) included in the liquid crystal panel are arranged in parallel in a screen 102. However, the scan electrodes converge on driver ICs (integrated circuits) 104a and 104b outside screen 102. Therefore, the electrodes are distributed more closely in the vicinity of IC outside screen 102.

When there is no variation in distribution of the electrodes as shown in FIG. 24A (for example, the center portion of the liquid crystal panel), and a voltage is sequentially applied to the scan electrodes in the scanning direction, the voltage induced in the detection pen becomes larger as the electrode to which the voltage is applied approaches the position indicated by the detection pen. The voltage induced in the detection pen attains the maximum value when the voltage is applied to an electrode indicated by the detection pen. As the electrode to which the voltage is applied becomes remote from the indicated position of the detection pen, the induced voltage decreases.

As described above, when there is no variation in the distribution of the electrodes, the maximum point of the induced voltage and the position indicated by the detection pen match.

However, in the vicinity of a portion (portion indicated by "A") where there is a variation in the distribution of the scan electrodes as shown in FIG. 25A, the detection pen is influenced by the voltage applied to the portion "A". Therefore, as shown in FIG. 25B, the position indicated by the detection pen and the maximum point of the induced voltage do not match. The maximum point of the induced voltage is shifted to the side of the portion "A" where the electrodes are less closely arranged (the left side in the figure). The more the position indicated by the detection pen approaches the portion "A", the larger the detection error becomes.

In order to correct such a detection error as described above, a method is considered for correcting the detected coordinates using a stored correction value corresponding to each pixel in the portions proximate to the upper and lower ends of the screen. However, it takes time to carry out correction with this method. A quick processing of a signal as in the tablet device reading a coordinates value by a digital signal disclosed in Japanese Patent Laying-Open 62-135966 cannot be implemented with this method.

SUMMARY OF THE INVENTION

One object of the present invention is to provide an image input device capable of inputting coordinates accurately.

Another object of the present invention is to provide an image input device capable of quickly correcting an error of the input coordinates.

According to the present invention, the image input device detecting a voltage induced in an indicating device indicating at least one part of an indication range by a voltage applied to a plurality of electrodes included in the indication range to recognize a position indicated by the indicating device includes: a memory for dividing, based on a characteristic of a deviation between the recognized position and the indicated position caused by an arrangement of a plurality of external electrodes outside the indication range connected to the plurality of electrodes included in the indication range, a range in which the deviation occurs into a plurality of correction regions each formed of a plurality of pixels for storage; an acquiring portion for acquiring correction information corresponding to each of the stored correction regions; and a correcting portion for correcting the recognized position based on the correction information, corresponding to a correction region including the recognized position, acquired by the acquiring portion.

According to the present invention, the deviation between the recognized position and the indicated position caused by the arrangement of the external electrodes outside the indication range is corrected for every divided correction region.

As a result, an image input device capable of inputting coordinates accurately can be provided.

Further, an image input device capable of quickly correcting an error of the input coordinates can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
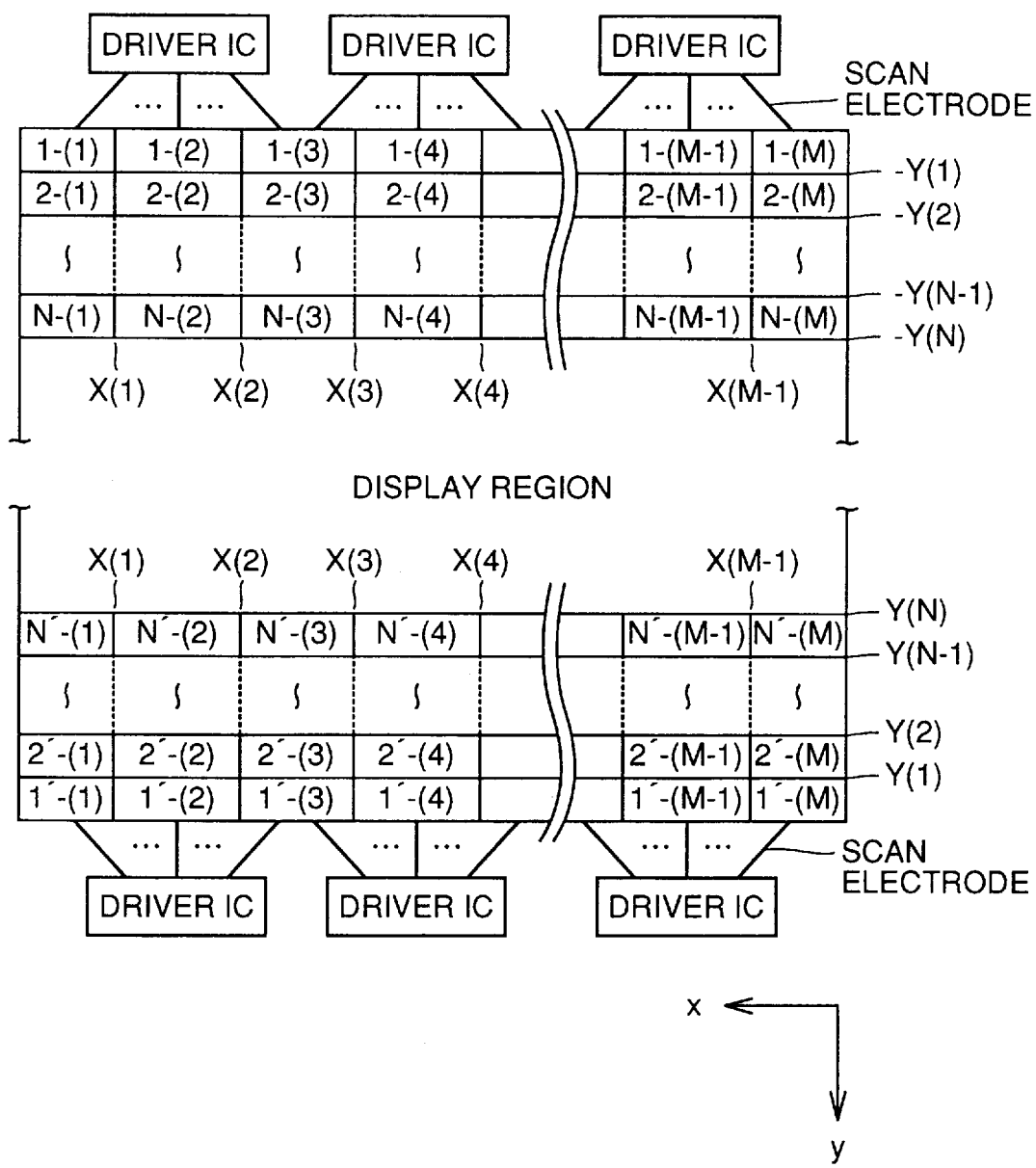
FIG. 1 is a diagram for describing a region in which coordinates are corrected in a tablet device incorporating display and input combined according to a first embodiment of the present invention.

Preferred embodiments of the present invention will now be described in detail with reference to the drawings. In the drawings, the same reference characters denote the same or corresponding portions.

[First Embodiment]

Figure 2:
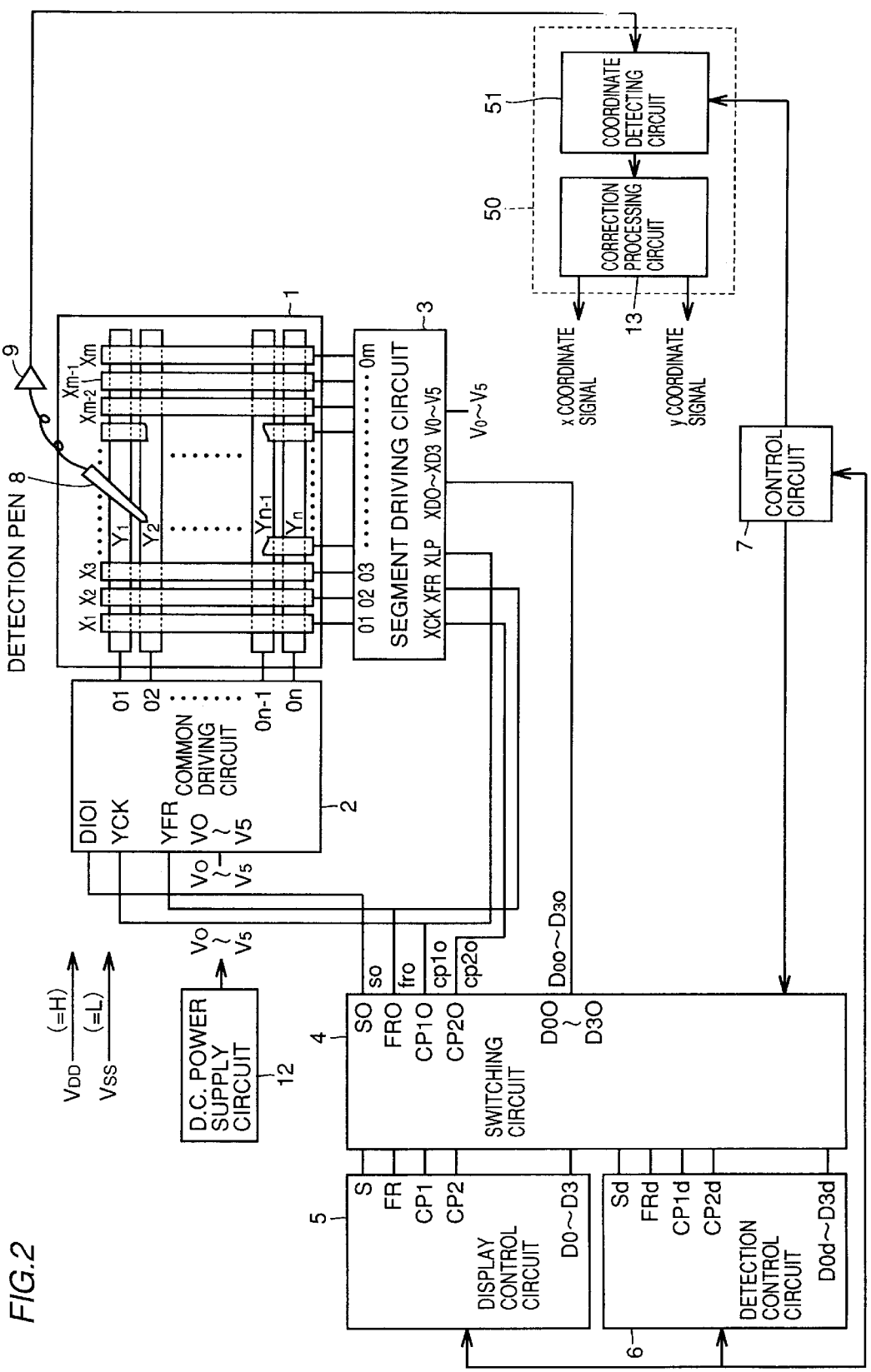
FIG. 2 is a block diagram showing a structure of the tablet device incorporating display and input combined according to the first embodiment of the present invention.
Figure 19:
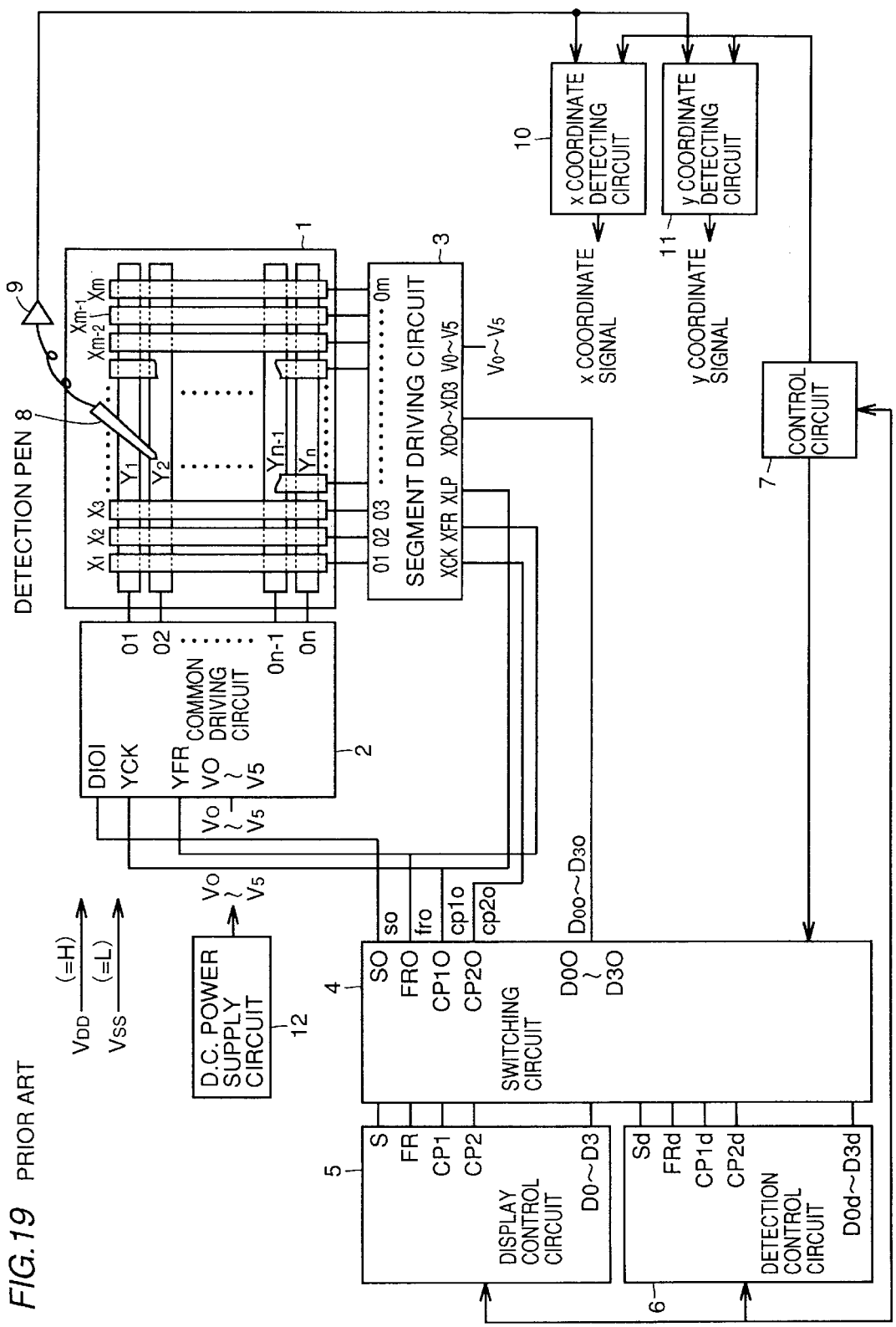
FIG. 19 is a block diagram showing a structure of a conventional tablet device incorporating display and input combined.
Figure 20:
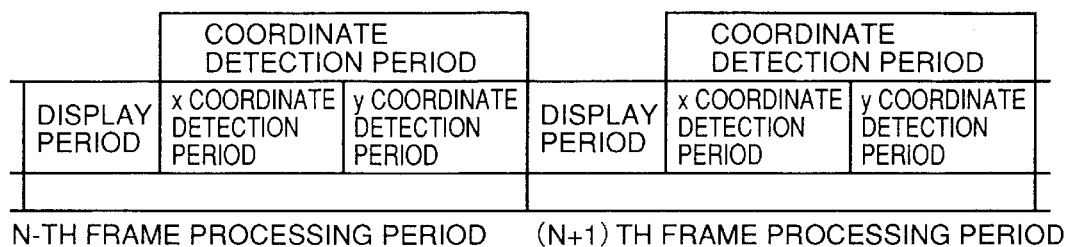
FIG. 20 is a diagram for describing processing for every frame carried out in the tablet device incorporating display and input combined.
Figure 21:
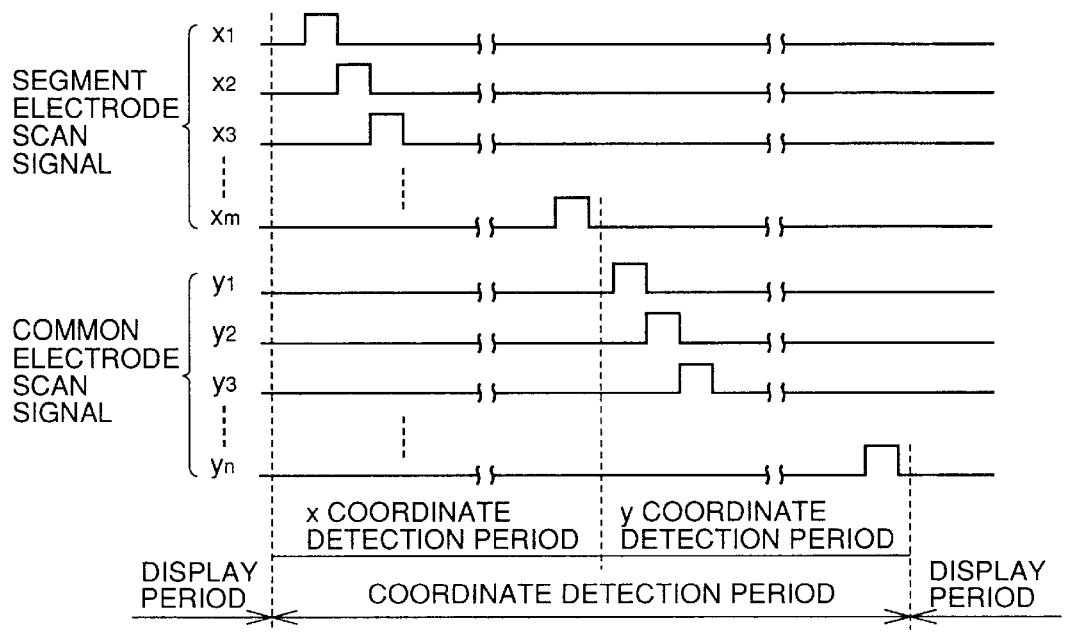
FIG. 21 is a diagram for describing signals applied to segment electrodes and common electrodes in the x-coordinate detection period and the y-coordinate detection period of FIG. 20.

The block diagram of the image input device according to the first embodiment of the present invention shown in FIG. 2 is different from the block diagram of the conventional image input device shown in FIG. 19 in that coordinates processing circuit 50 processing coordinates is provided instead of x-coordinate detecting circuit 10 providing an x-coordinate signal and y-coordinate detecting circuit 11 providing a y-coordinate signal of FIG. 19.

Coordinates processing circuit 50 includes a coordinates detecting circuit 51 detecting x and y coordinates and a correction processing circuit 13 for applying correction processing to the coordinates. Correction processing circuit 13 outputs corrected x and y coordinates signals.

Since the other portion is substantially the same as that of FIG. 19, the description thereof will not be repeated here.

Figure 3:
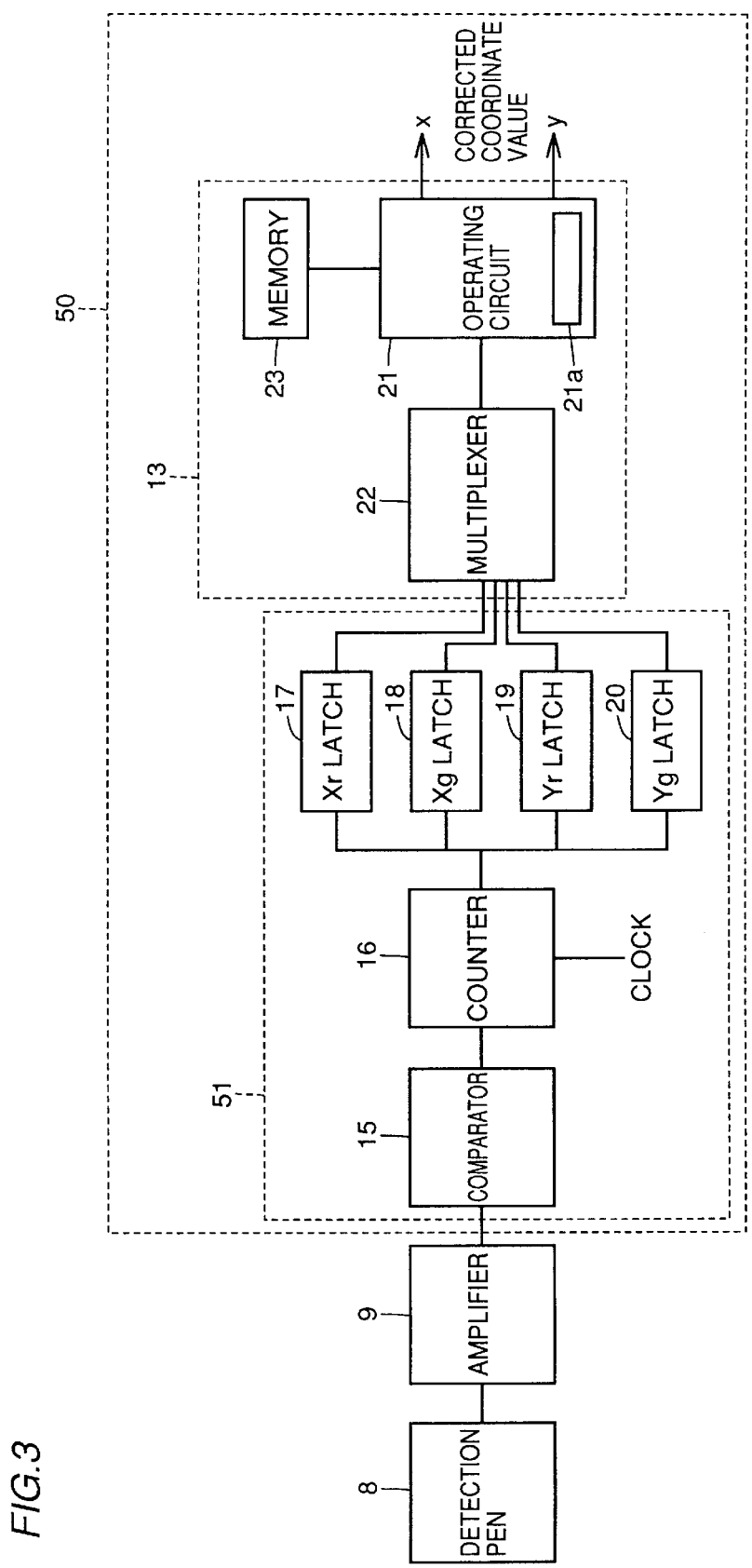
FIG. 3 is a block diagram showing a specific example of a coordinates processing circuit 50 of FIG. 2.

Referring to FIG. 3, coordinates processing circuit 50 is constituted of coordinates detecting circuit 51 and correction processing circuit 13.

Coordinates detecting circuit 51 includes comparator 15 for comparing a signal of detection pen 8 amplified by amplifier 9 with a threshold value to convert the signal to a binarized pulse, a counter 16 for counting the numbers of clocks at the times of rising and falling of an output from comparator 15, an Xr latch 17 for recording a count value Xr at the time of rising of the binarized pulse in detection of the x value of the coordinates, an Xg latch 18 for recording a count value Xg at the time of falling of the binarized pulse in detection of the x value of the coordinates, an Yr latch 19 for recording a count value Yr at the time of rising of the binarized pulse in detection of the y value of the coordinates, and a Yg latch 20 for recording a count value Yg at the time of falling of the binarized pulse in detection of the y value of the coordinates.

Correction processing circuit 13 includes a multiplexer 22 for selecting the count value recorded in each of latches 17 to 20 for output, an operating circuit 21 for carrying out operation of the count values or the like, and a memory 23 for storing the count values and the operation result.

Operating circuit 21 includes a correction operating portion 21a for carrying out a correction operation with respect to the count values.

Figure 4:
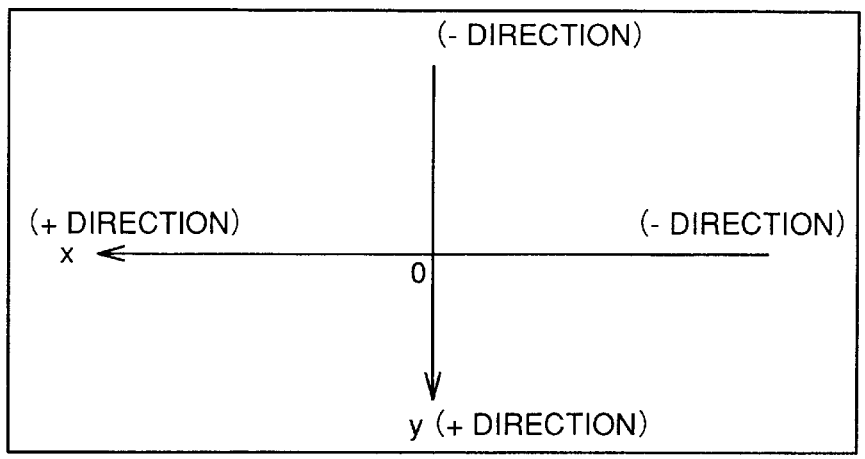
FIG. 4 is a diagram for describing a coordinates system of liquid crystal panel 1 of FIG. 2.

Referring to FIG. 4, in the liquid crystal panel, a coordinates system is set with a point at the center in the lateral and longitudinal directions as the origin, the leftward direction as the plus direction of the x value of the coordinates, and the downward direction as the plus direction of the y value of the coordinates.

Figure 5:
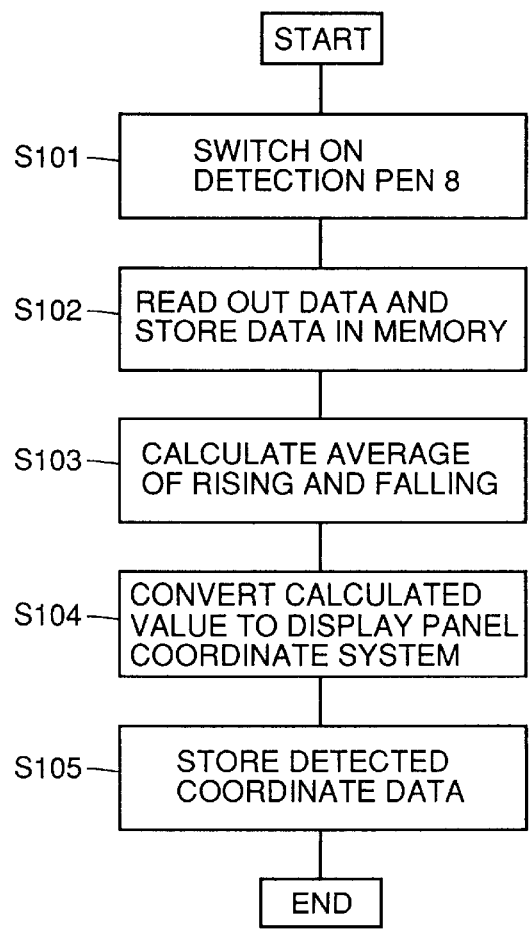
FIG. 5 is a flow chart showing processing from switch-on of detection pen 8 to storage of coordinates data detected by detection pen 8 in the tablet device incorporating display and input combined according to the first embodiment of the present invention.

FIG. 5 is a flow chart showing coordinates detection processing carried out by operating circuit 21 in this embodiment.

At step S101, the coordinates detection processing is started by detection pen 8 being pressed against the face of liquid crystal panel 1 and a pen switch in detection pen 8 being turned on. An induced voltage detected by detection pen 8 at step S101 is processed as follows.

Figure 6A:
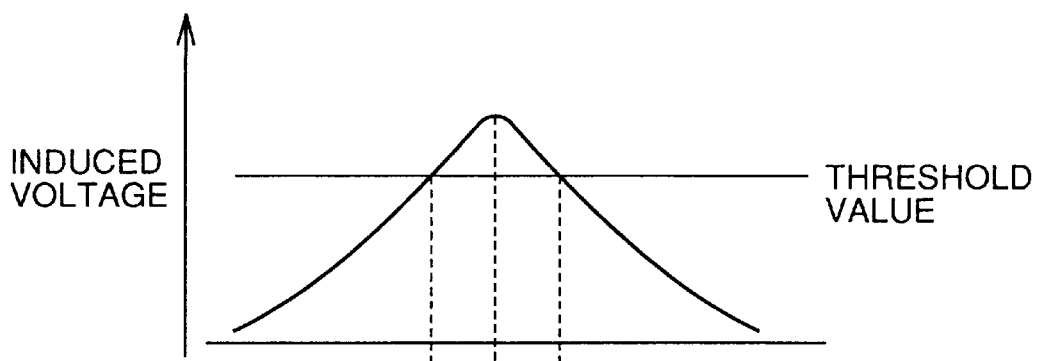
FIGS. 6A and 6B are diagrams showing an induced voltage generated in detection pen 8 and a corresponding output of a comparator 15.
Figure 6B:
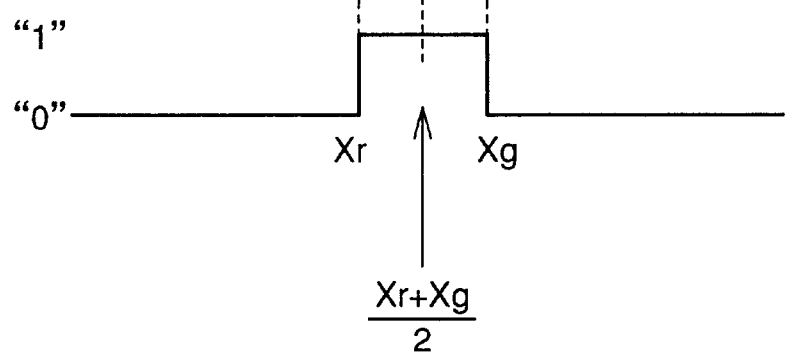

In the x-coordinate detection period, the induced voltage is generated in detection pen 8 due to a voltage applied to each of segment electrodes $X_1$ to $X_m$. The generated induced voltage is amplified by amplifier 9, and after that, the induced voltage describes a curve shown in FIG. 6A to be applied to comparator 15. As shown in FIG. 6B, a portion in which the induced voltage exceeds a predetermined threshold value in comparator 15 is determined as "1", and a portion in which the induced voltage is the predetermined threshold value or less is determined as "0". A transition point from "0" to "1" is determined as a rising point of the output of the x value of the coordinates, and a transition point from "1" to "0" is determined as a falling point of the output of the x value of the coordinates.

The count value of clocks at the rising point of the output of the x value of the coordinates and the count value of clocks at the falling point of the output of the x value of the coordinates are recorded in latches 17 and 18 as Xr and Xg, respectively.

On the other hand, in the y-coordinate detection period, a rising point and a falling point of the output of the y value of the coordinates are found similarly. The count value of clocks at the rising point and the count value of clocks at the falling point are recorded in latches 19 and 20 as Yr and Yg, respectively.

At step S102, operating circuit 21 reads out the count values recorded in latches 17 to 20 and stores the values in memory 23 using multiplexer 22.

At step S103, operating circuit 21 finds an average of the count values at the rising point and the falling point of each of the outputs of the x and y coordinates. As this average, a numerical value is used which is obtained by dividing the sum of the count value at the rising point and the count value at the falling point of each of the outputs of the x and y coordinates by two. This average is used as a peak position of the induced voltage as shown in FIGS. 6A and 6B.

At step S104, operating circuit 21 finds coordinates on the liquid crystal panel based on the calculated average, and sets the coordinates as coordinates (x, y) before correction.

At step S105, the coordinates (x, y) before correction are stored in memory 23.

The processing for correcting the coordinates (x, y) before correction will now be described with reference to FIG. 1.

In this embodiment, a segment electrode group is divided into the upper and lower portions at a position of coordinates y=0 (a line in the lateral direction at the center of the screen). Driver ICs arranged in the upper and lower portions are outside the screen. Driver ICs in the upper portion control the segment electrodes in the upper half of the screen, and driver ICs in the lower portion control segment electrodes in the lower half of the screen.

The tablet device incorporating display and input combined according to the present embodiment is characterized by dividing a display region in the vicinity of driver IC which is greatly influenced by variation in distribution of the electrodes into a plurality of regions and carrying out different corrections in the respective divided regions.

Figure 22:
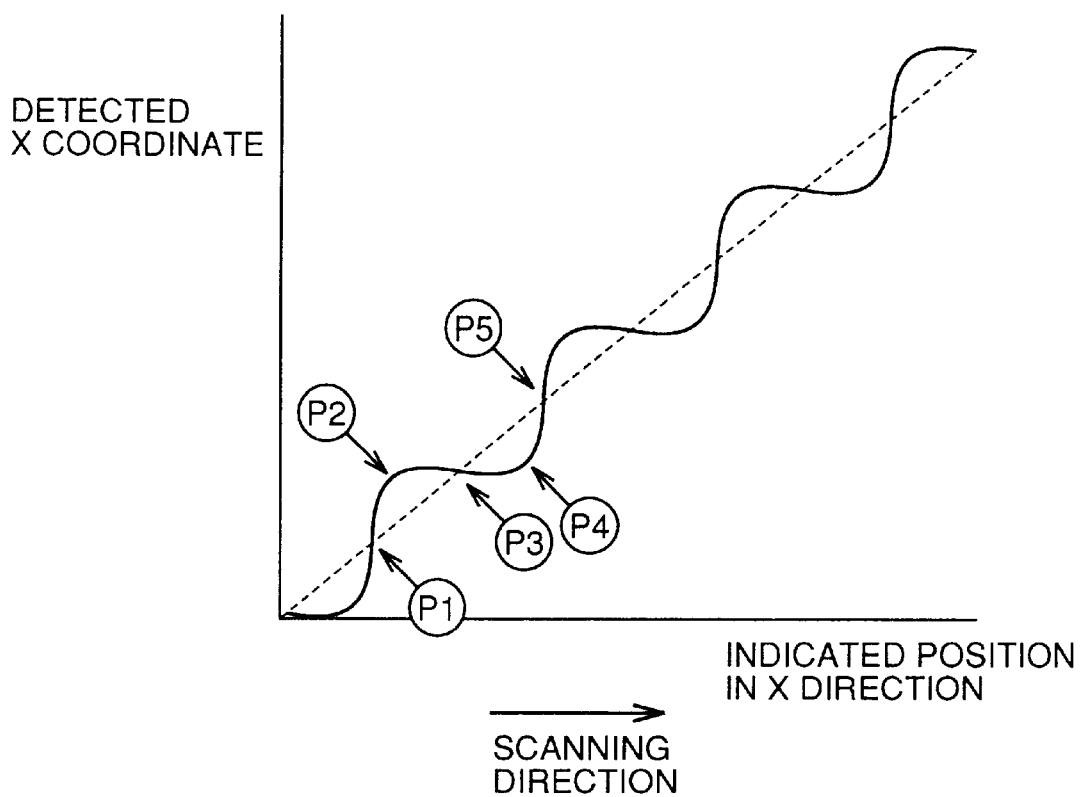
FIG. 22 is a diagram for describing a problem of the conventional tablet device incorporating display and input combined.
Figure 23:
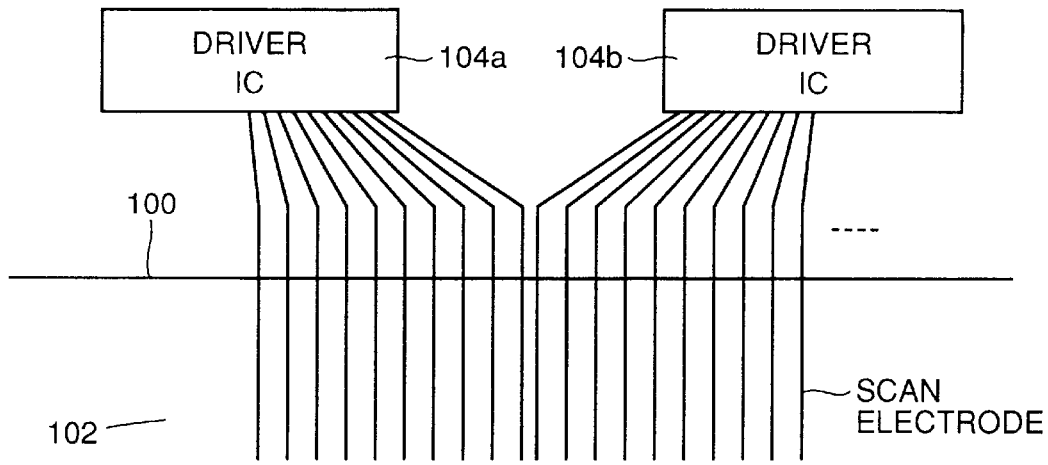
FIG. 23 is a diagram showing an arrangement of scan electrodes in the conventional tablet device incorporating display and input combined.
Figure 24A:
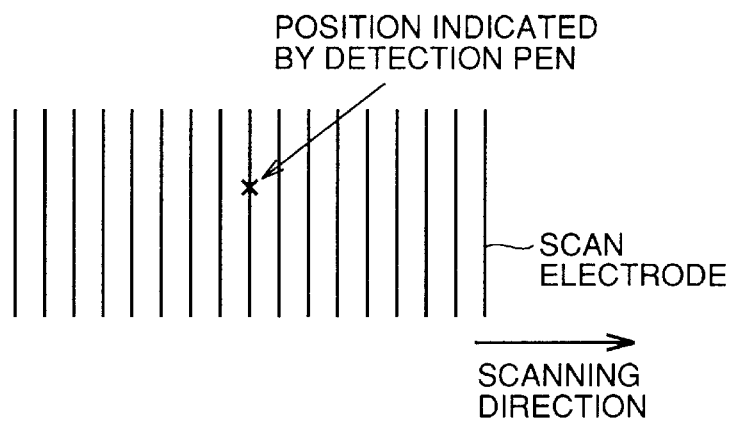
FIGS. 24A and 24B are a diagram for describing a peak of a voltage induced in a detection pen and a position indicated by the detection pen when scan electrodes are arranged in parallel.
Figure 24B:
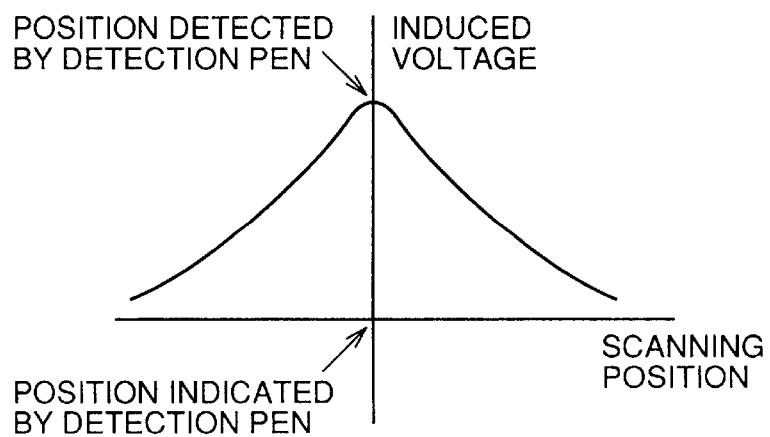
Figure 25A:
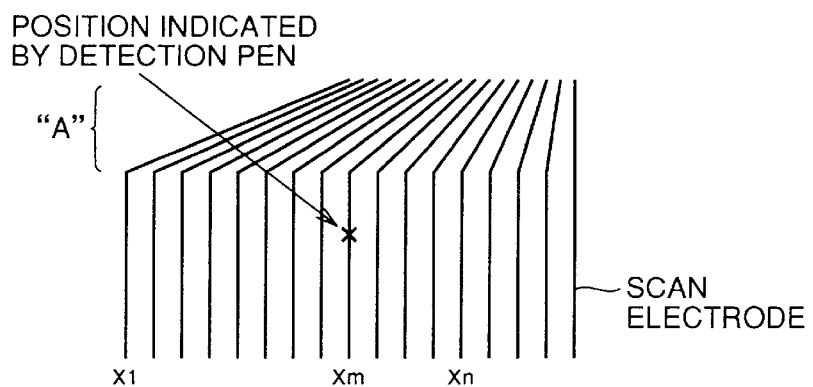
FIGS. 25A and 25B are a diagram for describing the relationship between the peak of the voltage induced in the detection pen and the position indicated by the detection pen when the scan electrodes converge on driver ICs.
Figure 25B:
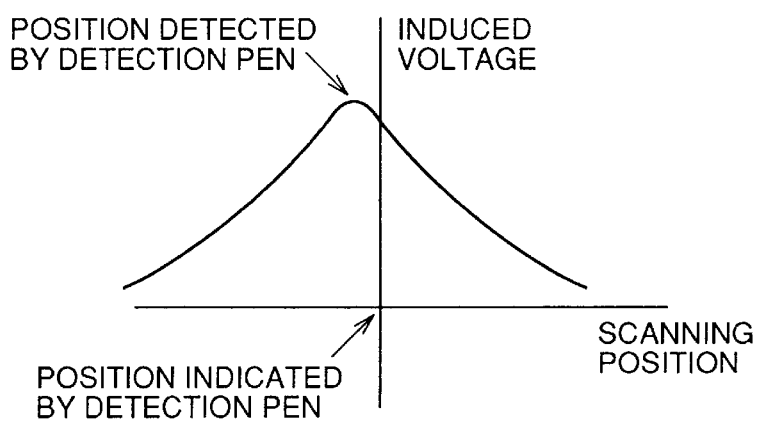
Figure 26:
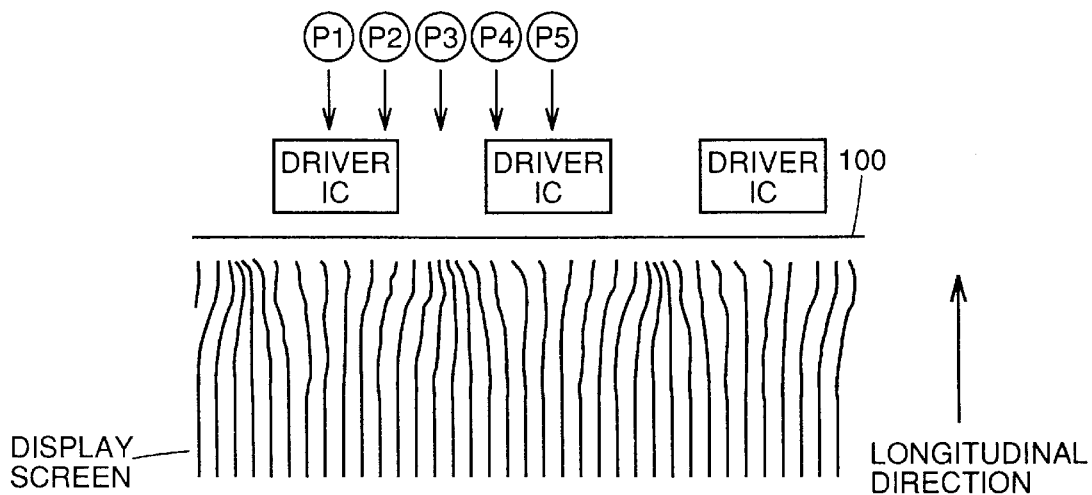
FIG. 26 is a second diagram showing a problem of the conventional tablet device incorporating display and input combined.

Referring to the figure, the greatest coordinates deviation points in the x axis direction (P2 and P4 in FIGS. 22 and 26) are set as x-coordinate boundary values X(1) to X(M−1), and the correction region is divided in the x axis direction with these positions as a boundary.

Since the coordinates deviation becomes smaller as the distance between the driver IC and the indicated coordinates (the distance in the y axis direction) becomes longer, it is necessary to set the amount of correction according to the y axis direction. Therefore, y-coordinate boundary values ±Y(1) to ±Y(N) are set so that the region is divided in the y axis direction according to the magnitude of the coordinates deviation of the detected x value of the coordinates such as six dots or more, five dots or more and less than six dots, four dots or more and less than five dots, . . . , based on the measurement result, and the correction region is divided in the y axis direction with these positions as a boundary.

Since the positional relationship of driver ICs in the upper and lower portions on the liquid crystal panel is in vertical symmetry, the influence by variation in distribution of the electrodes is also in vertical symmetry. Therefore, the divided regions on the upper side and the divided regions on the lower side are set to be in vertical symmetry. For convenience of the description, the divided regions on the upper side are labeled with characters 1-(1) to N-(M), and the divided regions on the lower side are labeled with characters 1'-(1) to N'-(M).

Correction processing is carried out for each of the divided regions.

Figure 7:
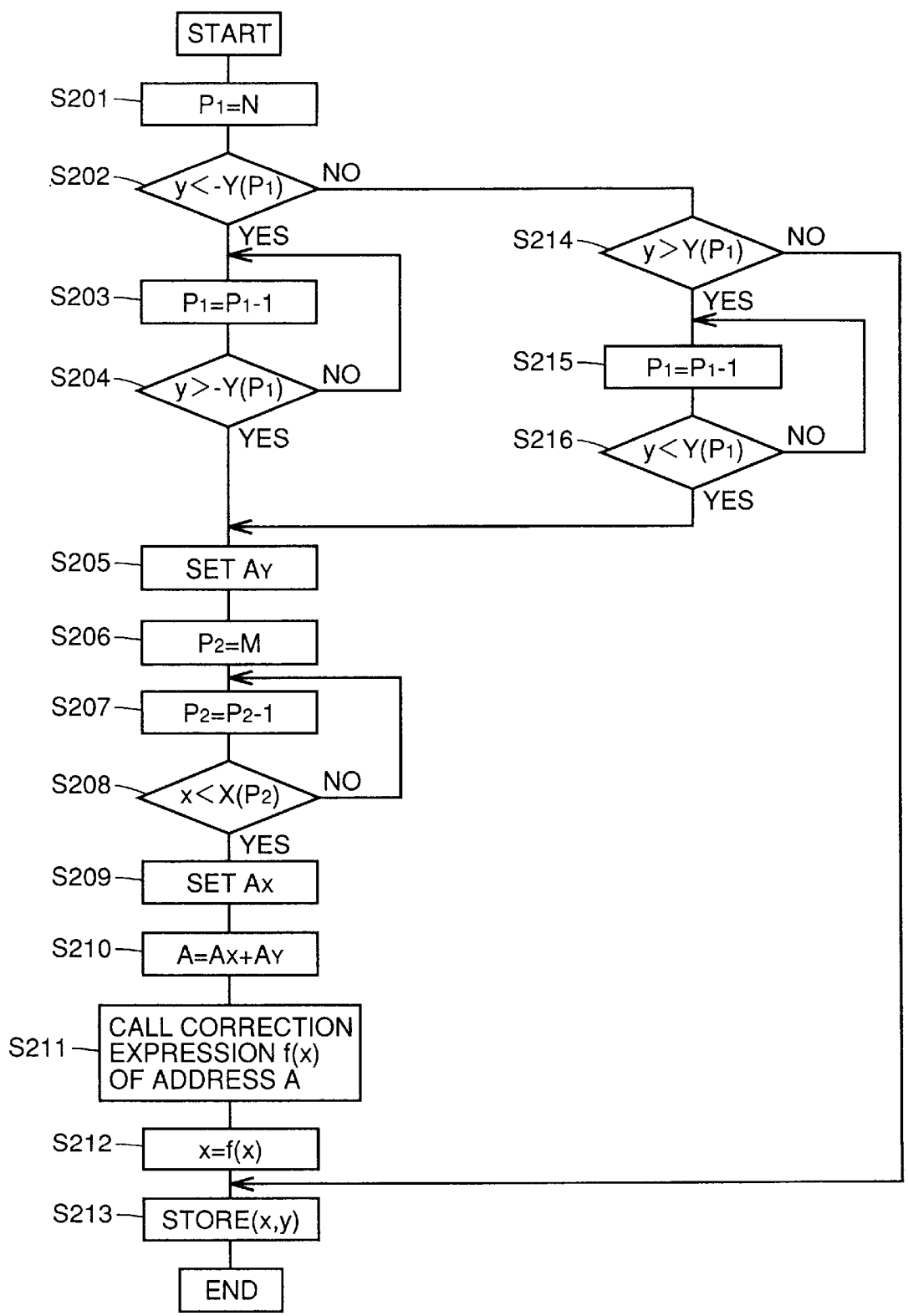
FIG. 7 is a flow chart showing correction processing carried out in the tablet device incorporating display and input combined according to the first embodiment of the present invention.

FIG. 7 is a flow chart showing processing carried out by operating circuit 21 in the correction processing of the present embodiment.

At step S201, in order to determine whether or not the detected coordinates stored in memory 23 at step S105 of FIG. 5 are within the correction region on the upper side of the display region, a numerical value N is substituted in counter $P_1$ for determining a region indicated by detection pen 8 out of the regions divided into N in the y axis direction.

At step S202, it is determined whether or not the relational expression of y<−Y ($P_1$) is satisfied. If YES, it indicates that the detected coordinates are in the correction region on the upper side, and the procedure goes to step 203.

At step S203, counter $P_1$ is decremented by one. At step S204, it is determined whether or not the relational expression of y>−Y($P_1$) is satisfied. The processing from step S203 is repeated until the determination result is YES.

If YES at step S204, the value of $P_1$ is data indicating to which region out of the divided regions in the y axis direction on the upper side the detected coordinates correspond. Therefore, at step S205, a head address $A_Y$ in memory 23 at which a correction expression for carrying out correction in the region is stored is set.

Figure 8:
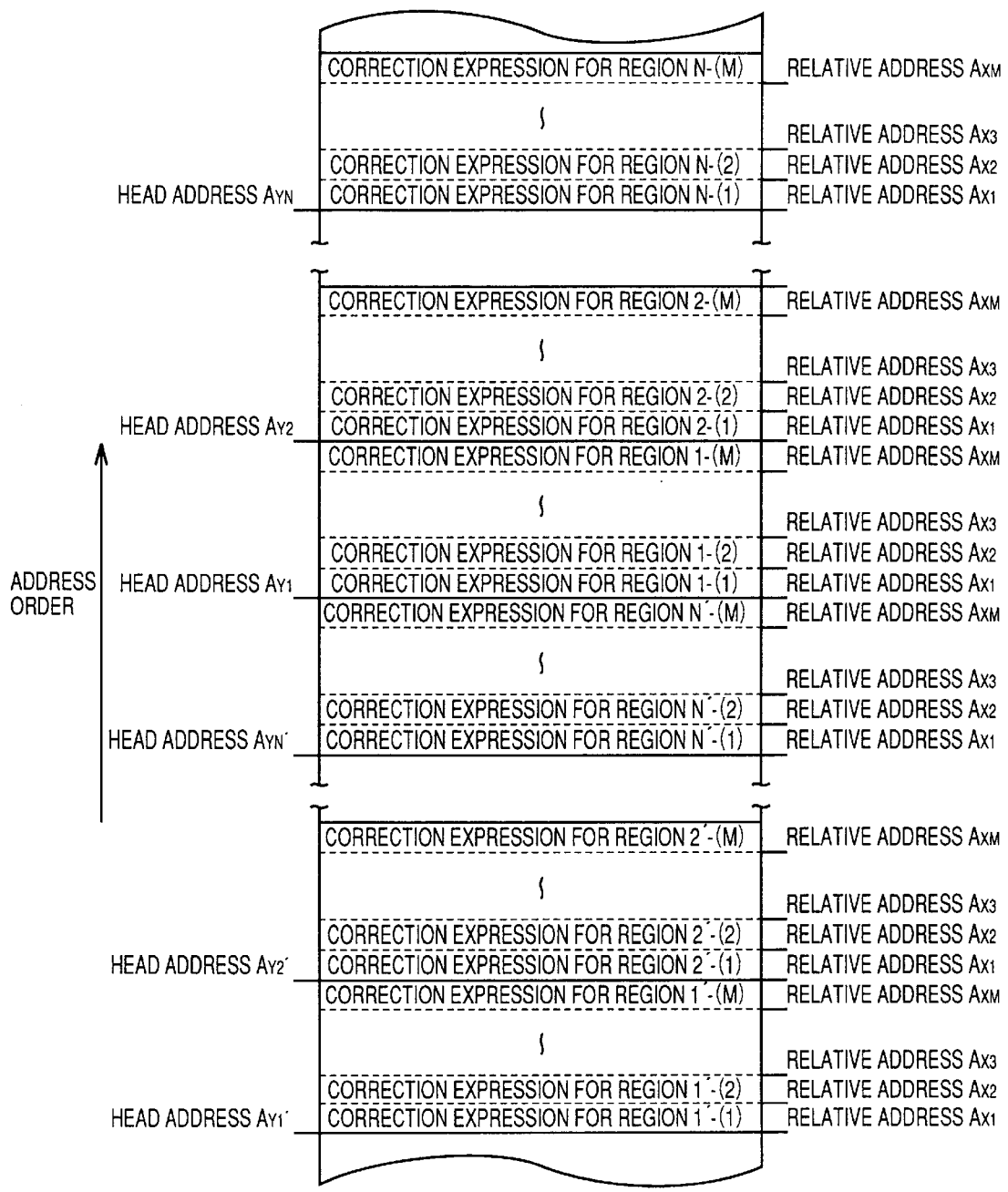
FIG. 8 is a diagram for describing a state in which correction expressions are stored according to the first embodiment.

The correction expressions are stored in memory 23 as shown in FIG. 8. More specifically, correction expressions for regions from 1'-(1) to 1'-(M) are stored in order with $A_{Y1}'$ as a head address. Correction expressions for regions from 2'-(1) to 2'-(M) are stored with $A_{Y2}'$ as a head address. Similarly, correction expressions for regions from 3'-(1), . . . to N'-(M) are stored in order.

Similarly, correction expressions for regions from 1-(1) to N-(M) are stored with $A_{Y1}$ as a head address.

By setting a corresponding head address $A_Y$ based on a position in the y axis direction of a region including the detected coordinates and setting a relative address $A_X$ from the head address based on a position in the x axis direction of the region including the detected coordinates, a desired correction expression can be called.

At step S206, a numerical value M is substituted in a counter $P_2$ for determining to which region out of the divided regions in the x axis direction the detected coordinates stored in memory 23 at step S105 of FIG. 5 correspond.

At step S207, counter $P_2$ is decremented by one. At step S208, it is determined whether or not the relational expression of x<X($P_2$) is satisfied. The processing from step S207 is repeated until the result at step S208 is YES.

If YES at step S208, the region in the x axis direction is identified based on the value of counter $P_2$, and relative address $A_X$ for calling a corresponding correction expression out of the correction expressions stored in memory 23 as shown in FIG. 8 is set at step S209.

At step S210, Ay set at step S205 and $A_X$ set at step S209 are added, and a storage address A for the correction expression is calculated.

At step S211, a correction expression f(x) stored at address A is called.

At step S212, the processing for correcting the detected x value of the coordinates is carried out using the called correction expression f(x).

At step S213, the corrected coordinates (x, y) obtained at step S212 are stored in memory 23 as display coordinates data.

If NO at step S202, it is determined whether or not the relational expression of y>Y($P_1$) is satisfied. If YES at step S214, it indicates that the detected coordinates are within the correction region on the lower side of the screen. At step S215, counter $P_1$ is decremented by one. At step S216, it is determined whether or not the relational expression of y<Y($P_1$) is satisfied. If YES at step S216, the processing from step S205 is carried out.

If NO at step 216, the processing from step S215 is repeated.

On the other hand, if NO at step S214, it indicates that the detected coordinates are not within a region in which correction is carried out. Therefore, at step S213, the detected coordinates (x, y) are stored in memory 23 as display coordinates data without correction.

Figure 9:
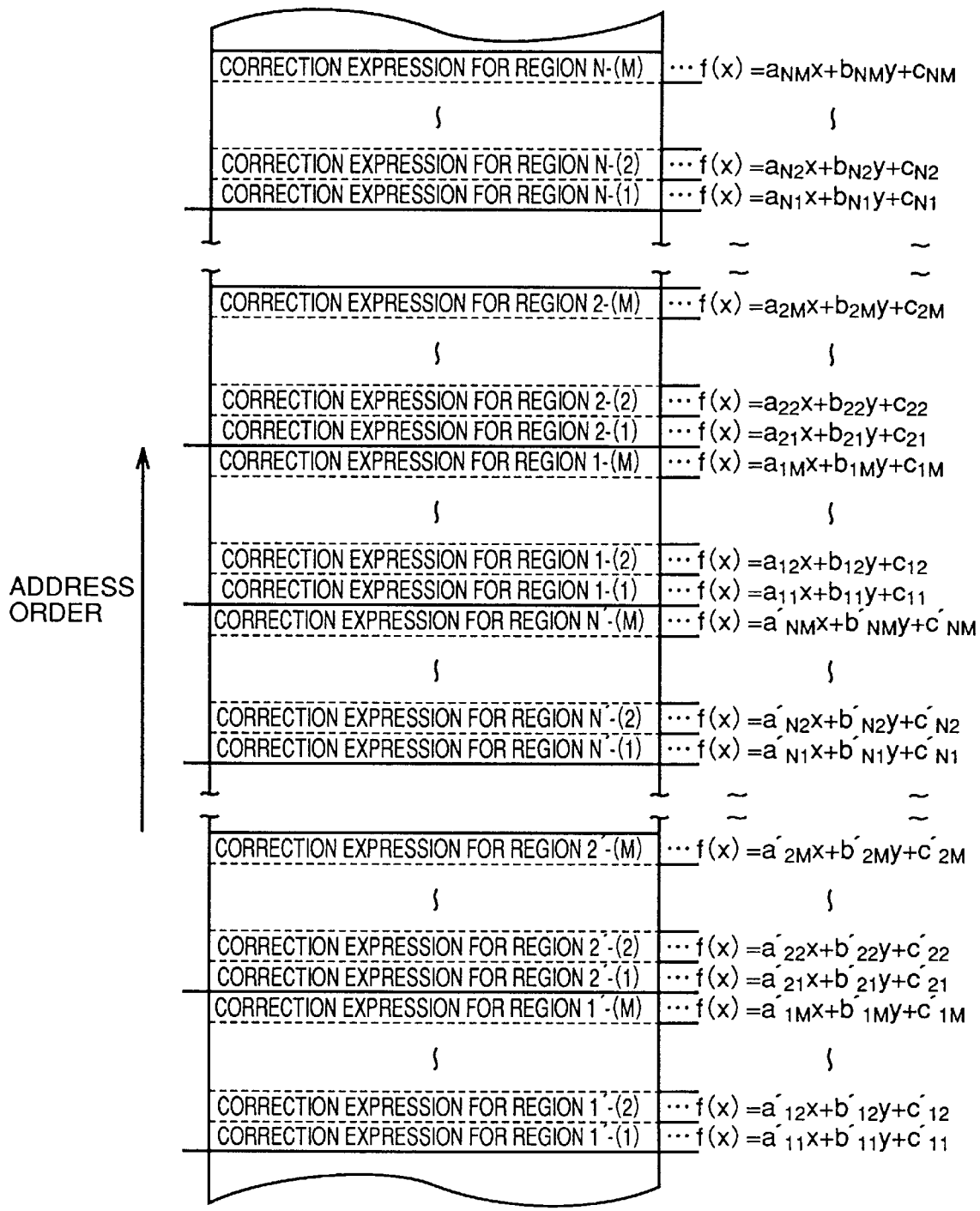
FIG. 9 is a diagram for describing a specific example of the correction expressions according to the first embodiment.

Referring to FIG. 9, correction expressions corresponding to the respective regions are stored in memory 23. A correction expression in a correction region i-(j) is generally given by the following expression (1):

$$f(x)=a_{ij}x+b_{ij}y+c_{ij} \tag{1}$$

More specifically, constants $a_{ij}$, $b_{ij}$, and $c_{ij}$ are set for the respective correction regions.

As described above, according to the present embodiment, correction is carried out according to the correction expressions of the x value of the coordinates corresponding to the respective divided correction regions. Therefore, correction in the x axis can be carried out with high accuracy.

[Second Embodiment]

Figure 10:
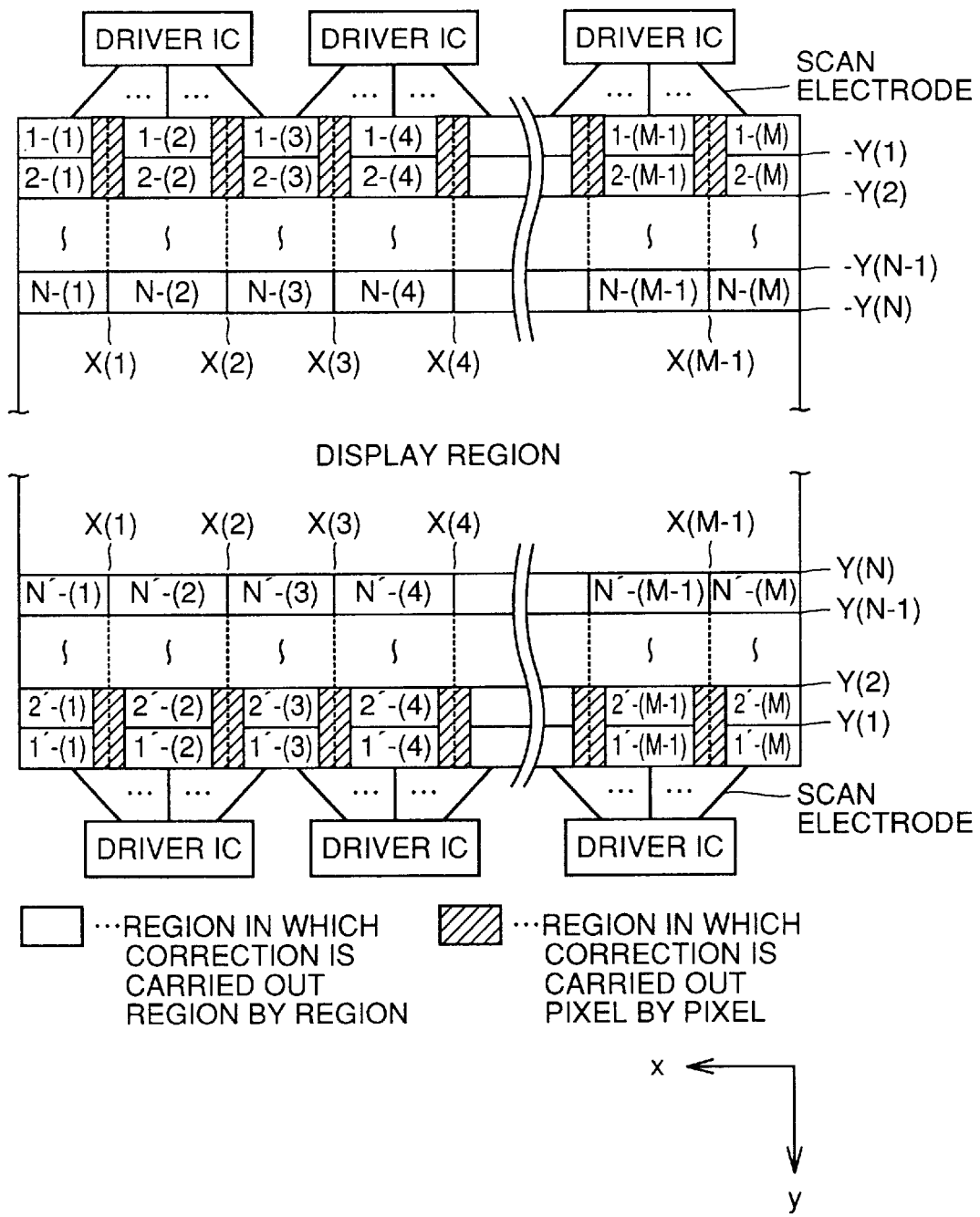
FIG. 10 is a diagram for describing a region in which coordinates are corrected in a tablet device incorporating display and input combined according to a second embodiment of the present invention.

Since a tablet device incorporating a combined display and input shown in FIG. 10 according to the second embodiment has the same structure as that of the above described first embodiment, the description thereof will not be repeated here.

The tablet device incorporating a combined display and input according to the present embodiment is characterized in that a region in which correction is carried out region by region and a region in which correction is carried out pixel by pixel are provided as a region in which coordinates of a liquid crystal panel are corrected.

Referring to FIG. 10, the magnitude of deviation of detected coordinates with respect to an indicated position for every pixel is measured in advance. Based on the measurement result, a region in which correction is carried out pixel by pixel shown by hatching in the figure is set for a portion where the coordinates deviation is a reference value or more (for example, five dots or more). For a portion where the coordinates deviation is relatively small, a region in which correction is carried out region by region according to correction expressions is set, similar to the case of the first embodiment. Correction is carried out in each of the above described regions.

Figure 12:
FIG. 12 is a diagram for describing a state in which correction expressions are stored according to the second embodiment.

In the present invention, correction data for the region in which correction is carried out region by region and the region in which correction is carried out pixel by pixel are stored as shown in FIG. 12. More specifically, correction expressions corresponding to the respective regions are stored as correction data for the region in which correction is carried out region by region similar to the case of the first embodiment. On the other hand, as correction data for the region in which correction is carried out pixel by pixel, corrected coordinates corresponding to the respective pixels in the region in which correction is carried out pixel by pixel are stored. More specifically, in the region in which correction is carried out region by region, correction according to mathematical expressions corresponding to the respective correction regions is carried out similar to the case of the first embodiment, and in the region in which correction is carried out pixel by pixel, detected pixel coordinates are replaced by corresponding corrected coordinates.

Figure 11:
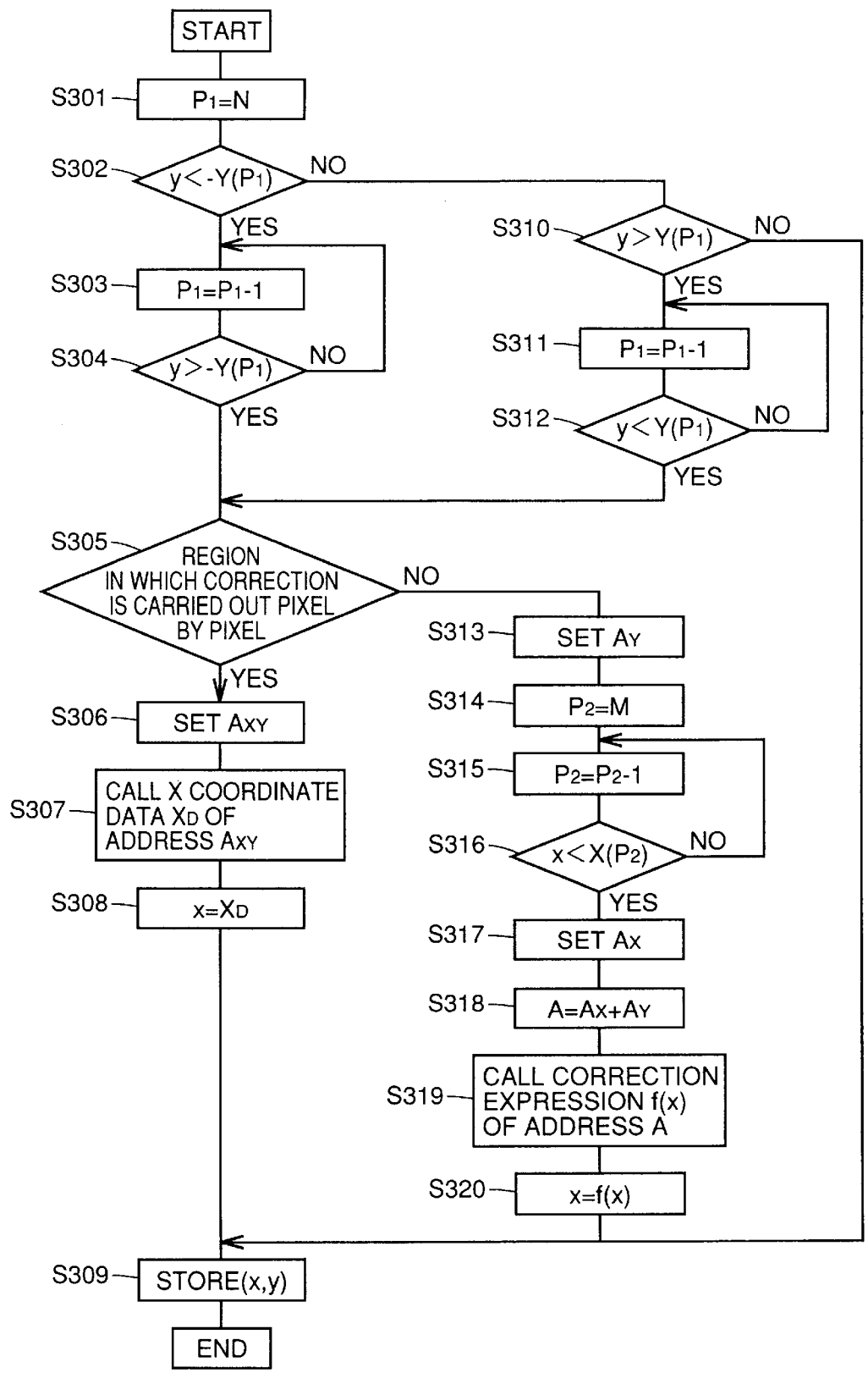
FIG. 11 is a flow chart for describing correction processing of the coordinates according to the second embodiment of the present invention.

The processing carried out by operating circuit 21 in the correction processing of the present embodiment will be described with reference to the flow chart of FIG. 11.

Since the detection processing (processing shown in FIG. 5) of coordinates data prior to the correction processing is similar to that of the first embodiment, the description thereof will not be repeated here.

At steps S301 to S304 and steps S310 to S312, the position in the y axis direction of a correction region including detected coordinates is recognized. Since this processing is substantially the same as that at steps S201 to S204 and steps S214 to S216 of FIG. 7, the description thereof will not be repeated here.

At step S305, it is determined whether or not the detected coordinates are included in the region in which correction is carried out pixel by pixel. If YES at step S305, an address $A_{XY}$ is set at step S306 at which pixel-by-pixel correction data set for the pixel indicated by the detected coordinates (x, y) is stored. At step S307, pixel-by-pixel correction data $X_D$ stored at address $A_{XY}$ is called. As step S308, the called data $X_D$ is set as the corrected x coordinates.

At step S309, the corrected coordinates (x, y) are stored in memory 23 as display coordinates data.

If NO at step S305, the processing from steps S313 to S320 is carried out. Since this processing is the same as that at steps S205 to S212, the description thereof will not be repeated here.

The pixel-by-pixel correction data may be set corresponding to each pixel included in the region in which correction is carried out pixel by pixel as described above. However, the pixel-by-pixel correction data can be set as follows.

Figure 13:
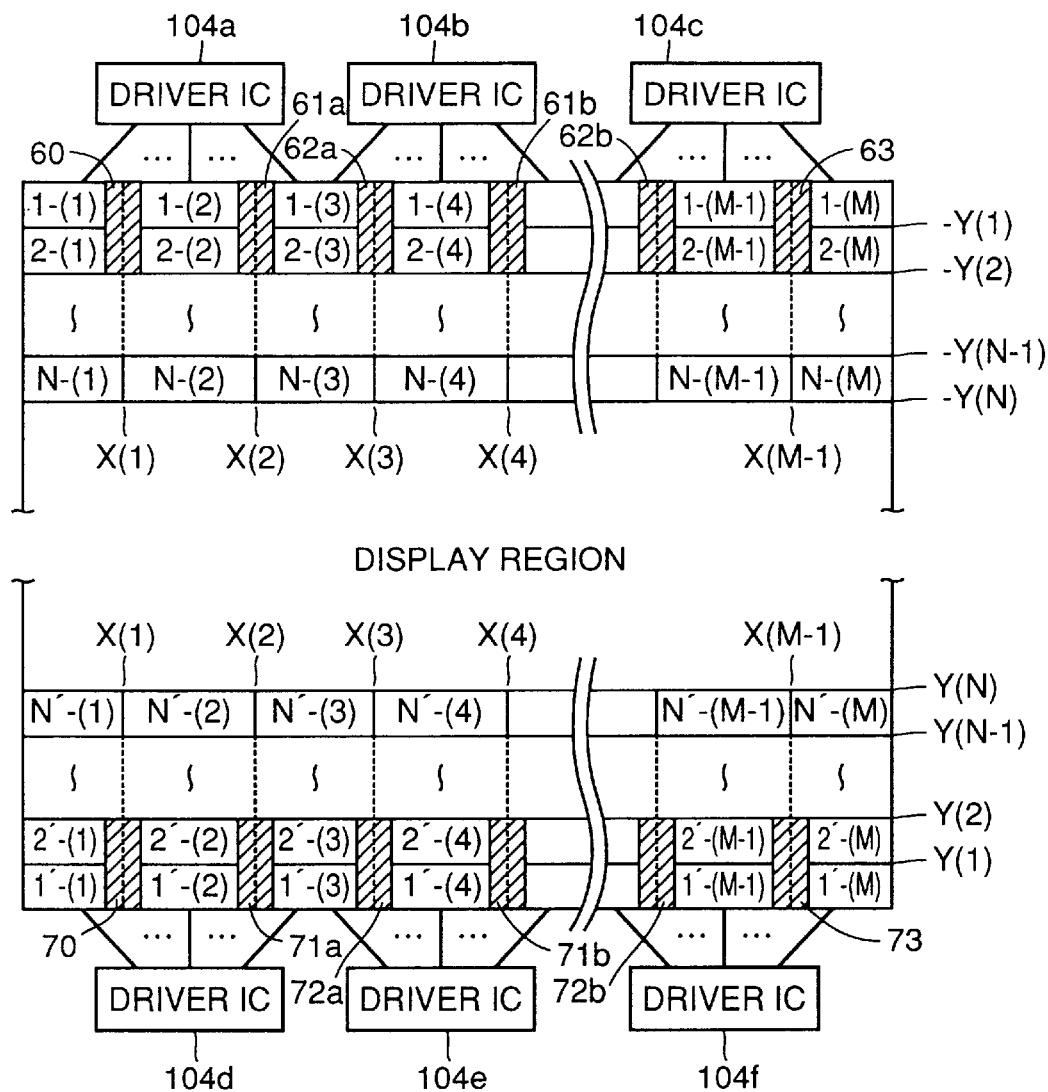
FIG. 13 is a diagram for describing correction processing in a region in which correction is carried out pixel by pixel.

Referring to FIG. 13, the positional relationships of regions 61a and 61b in which correction is carried out pixel by pixel with respect to driver ICs 104a and 104b are the same. Therefore, common data can be used as pixel-by-pixel correction data for regions 61a and 61b. Similarly, common data can be used as pixel-by-pixel correction data for regions 62a and 62b in which correction is carried out pixel by pixel. Since regions 60 and 63 in which correction is carried out pixel by pixel are at right and left ends of the display region, separate data must be used for these regions.

For regions 70, 71a, 72a, 71b, 72b, and 73 in which correction is carried out pixel by pixel on the lower side, pixel-by-pixel correction data may be set similar to the case of the regions in which correction is carried out pixel by pixel on the upper side.

Since the regions in which correction is carried out pixel by pixel on the upper side and the regions in which correction is carried out pixel by pixel on the lower side are positioned in symmetry, the same pixel-by-pixel correction data can be used for the regions positioned in symmetry (for example, regions 60 and 70).

[Third Embodiment]

A third embodiment of the present invention will be described with reference to FIG. 14.

A tablet device incorporating a combined display and input according to the present embodiment has substantially the same structure as that of the first embodiment, the description thereof will not be repeated here.

The tablet device incorporating a combined display and input according to the present embodiment is similar to those of the first and second embodiments in that a region having a large coordinates detection deviation is divided into a plurality of regions, and that correction is carried out in the respective divided regions. However, the tablet device incorporating a combined display and input according to the present embodiment is characterized in that the same correction expression is used for regions having the same relative positional relationship with respect to the driver IC in FIG. 1. More specifically, in FIG. 1, correction regions 1-(2), 1-(4), and 1-(M−1) have the same relative positional relationship with respect to the respective driver ICs. Further, since correction regions 1'-(2), 1'-(4), and 1'-(M−1) have the same relative positional relationship with respect to the respective driver ICs and are in symmetry with respect to correction regions 1-(2), 1-(4), and 1-(M−1), these correction regions use the same correction expression.

Figure 14:
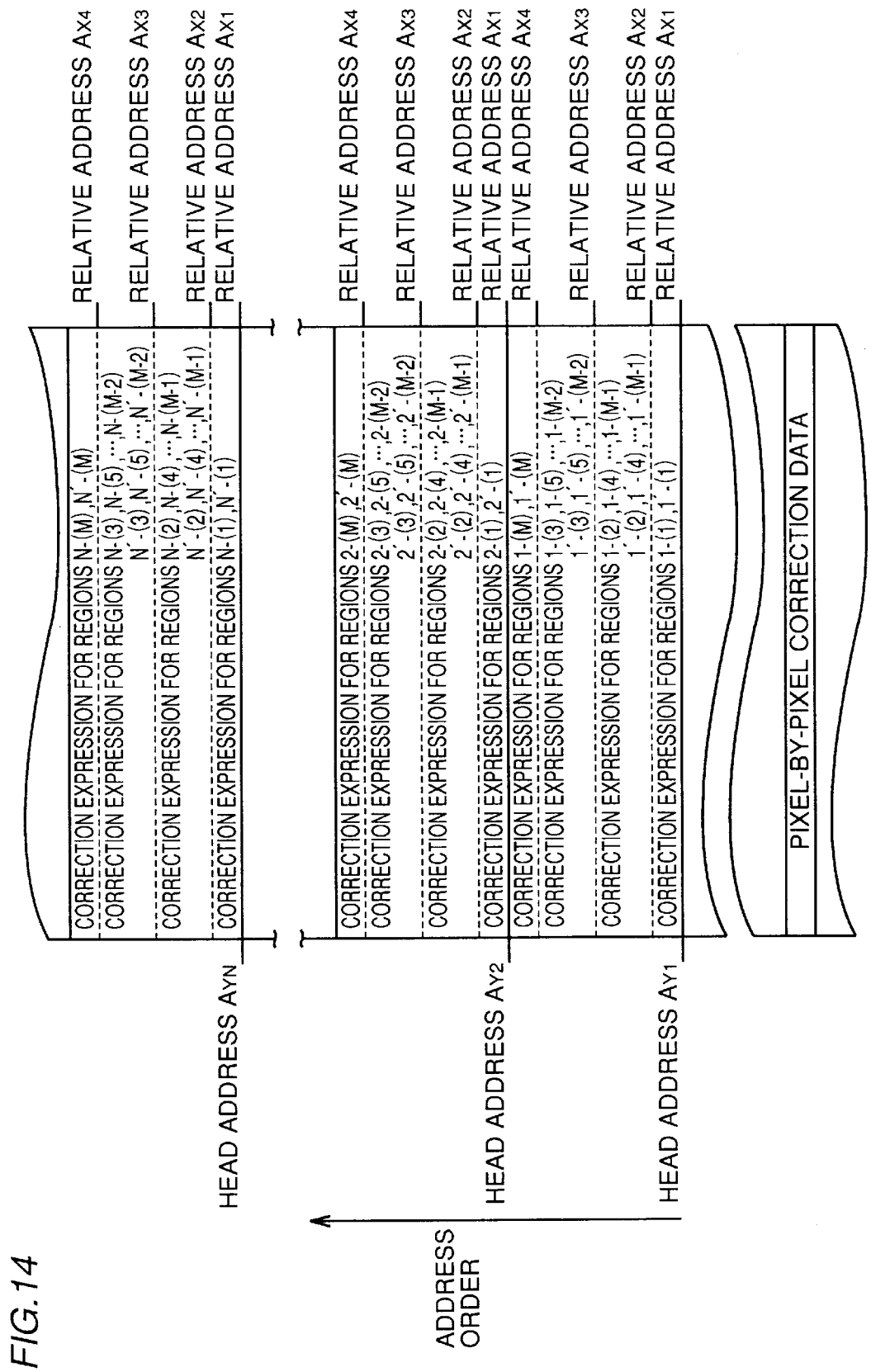
FIG. 14 is a diagram for describing a state in which correction expressions are stored in a tablet device incorporating display and input combined according to a third embodiment of the present invention.

More specifically, as shown in FIG. 14, a common correction expression for correction regions 1-(1) and 1'(1), a common correction expression for correction regions 1-(2), 1-(4), . . . , 1-(M−1), 1'-(2), 1'-(4), . . . , 1'-(M−1), a common correction expression for correction regions 1-(3), 1-(5), . . . , 1-(M−2), 1'-(3), 1'-(5), . . . , 1'-(M−2), and a common correction expression for correction regions 1-(M) and 1'-(M) are stored in memory 23 with $A_{Y1}$ as a head address.

Similarly, the second and subsequent correction expressions in the y axis direction are stored with $A_{Y2}$ as a head address.

Figure 15:
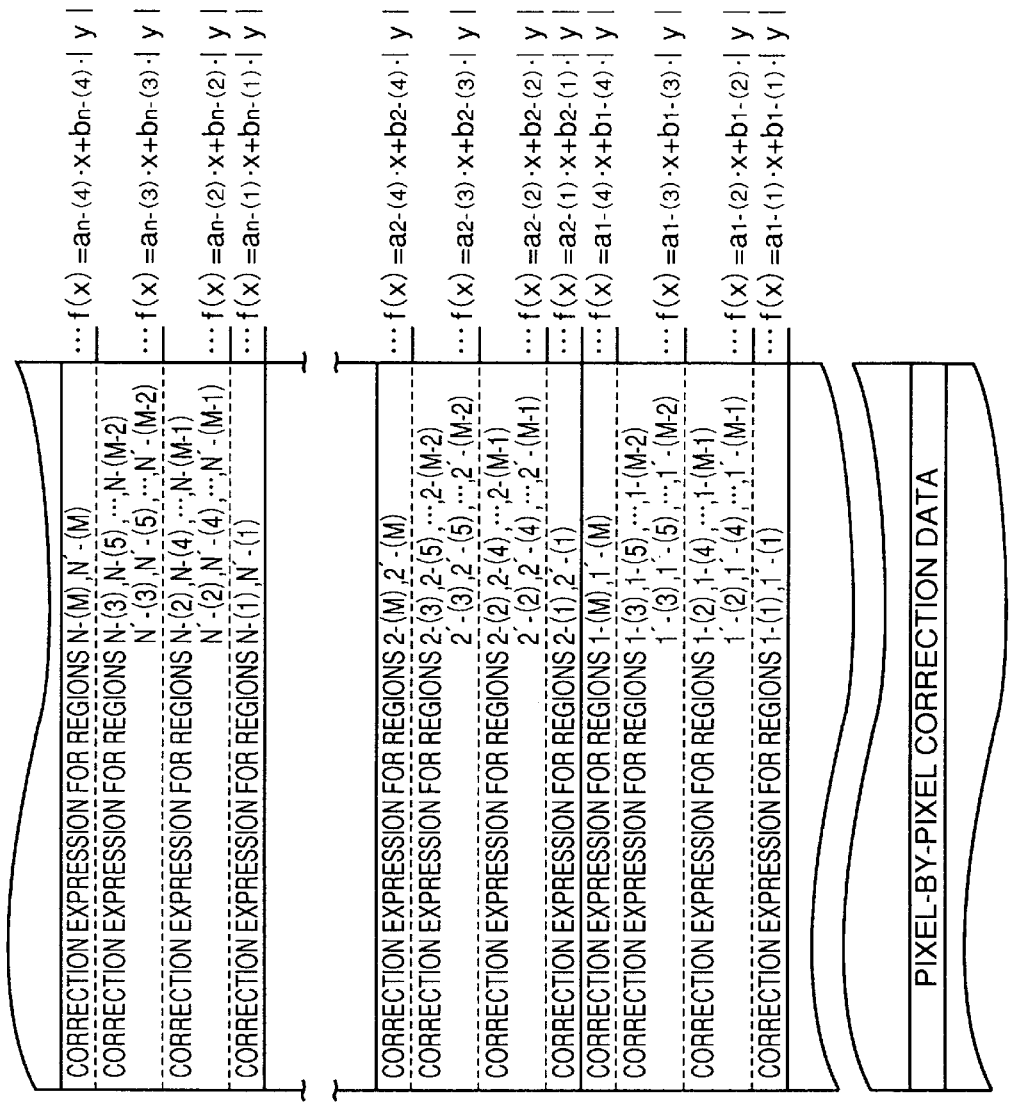
FIG. 15 is a diagram for describing a specific example of the correction expressions in FIG. 14.

Referring to a specific example of the respective correction expressions shown in FIG. 15, the respective correction expressions are given by the following expression (2):

$$f(x) = a_{i-(j)}x + b_{i-(j)}|y| \qquad (2)$$

Figure 16:
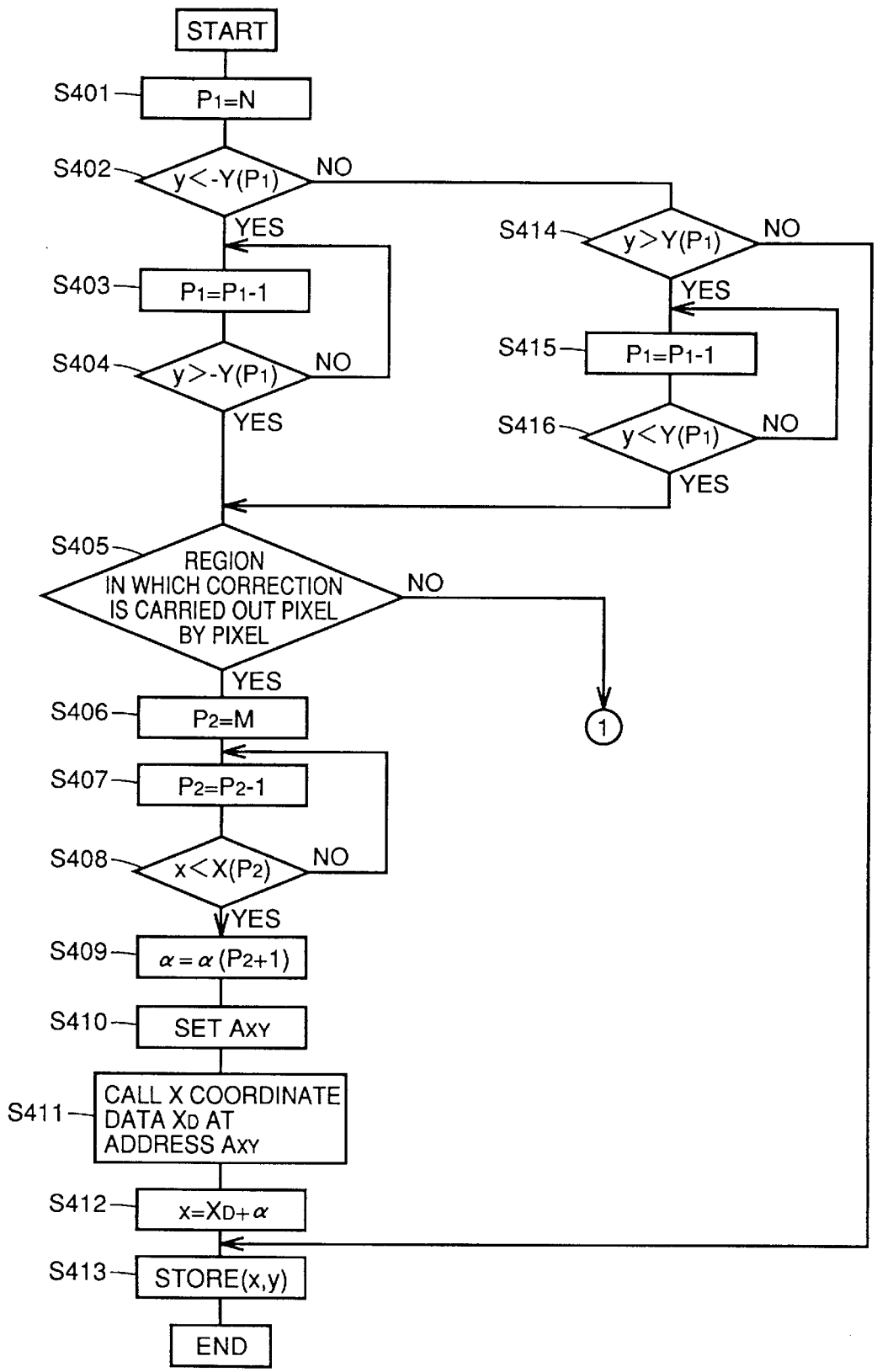
FIGS. 16 to 18 are flow charts showing correction processing of coordinates according to the third embodiment of the present invention.
Figure 17:
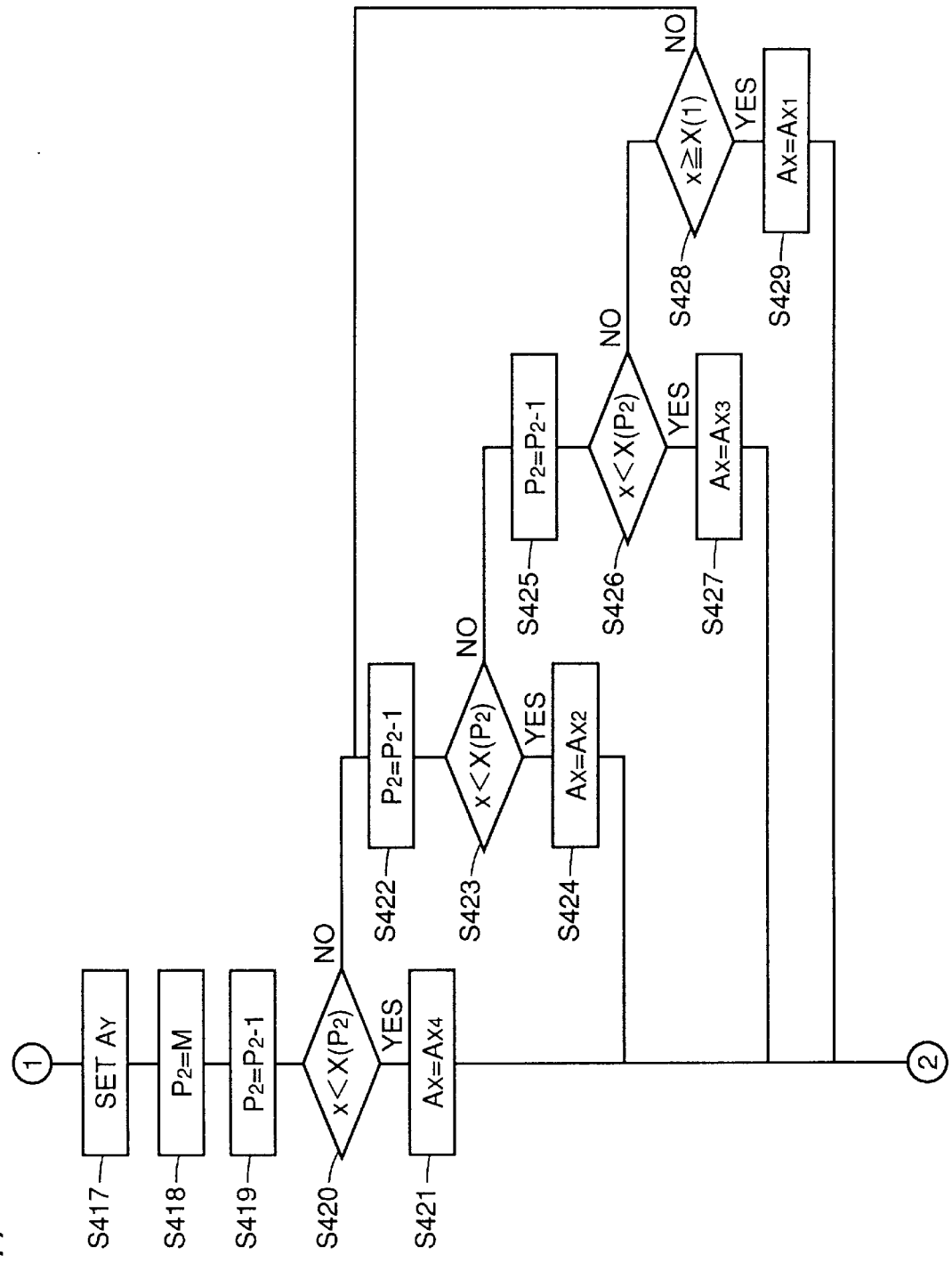
Figure 18:
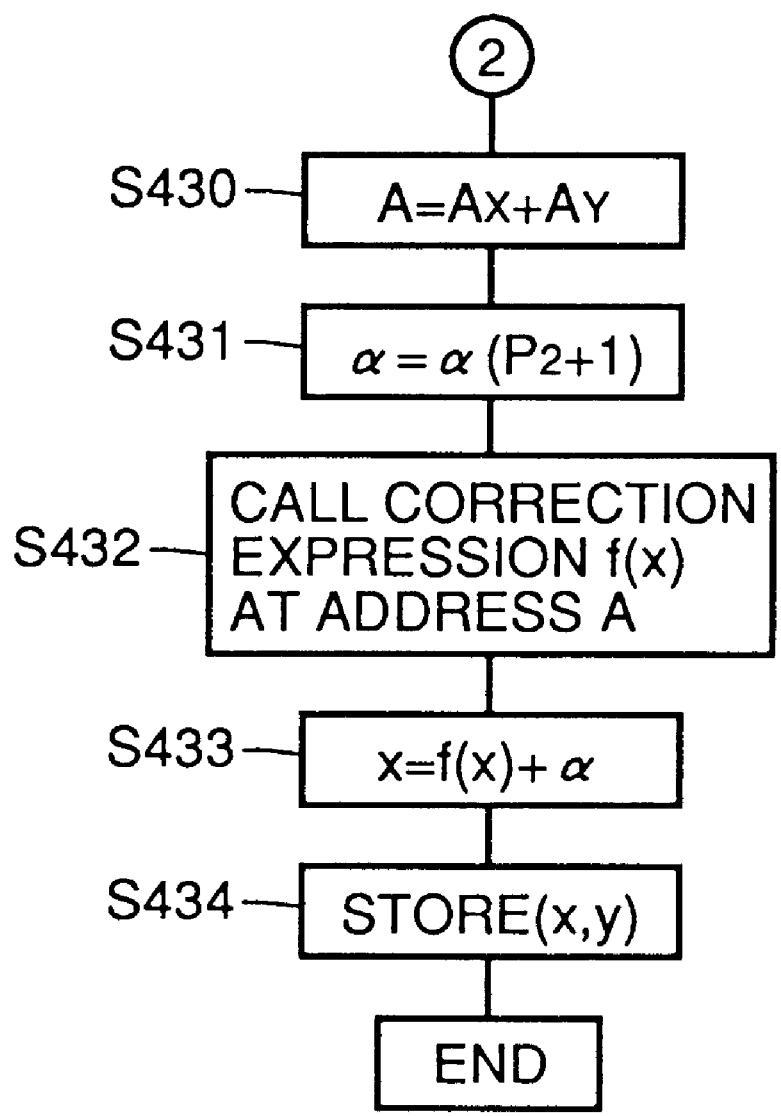

Referring to FIGS. 16 to 18, these flow charts, coupled at ① and ②, show a series of processing carried out by operating circuit 21 in the correction processing according to the present embodiment.

At steps S401 to S404 and S414 to S416, the position in the y axis direction of a correction region including the detected coordinates is determined. Since this processing is substantially the same as that at steps S201 to S204 and S214 to S216 of FIG. 7, the description thereof will not be repeated here. At step S405, it is determined whether or not the detected coordinates are included in the region in which correction is carried out pixel by pixel. If YES at step S405, the numerical value M is substituted in counter $P_2$ for determining to which region in the x axis direction the detected coordinates belong at step S406. At step S407, counter $P_2$ is decremented by one.

As step S408, it is determined whether or not relational expression of $x<X(P_2)$ is satisfied. If NO at step S408, the processing from step S407 is repeated.

If YES at step S408, an adjustment value $\alpha$ is calculated for the detected coordinates (x, y), which are determined as the region in which correction is carried out pixel by pixel. The adjustment value $\alpha$ is defined by the position in the x axis direction of a correction region including the indicated position (value taken by counter $P_2$). The adjustment value $\alpha$ is calculated in order to carry out correction more accurately in the x axis direction of the screen.

At step S410, address $A_{XY}$ corresponding to the detected coordinates is set from pixel-by-pixel correction coordinates data stored in memory 23. At step S411, x coordinates data $X_D$ stored at address $A_{XY}$ is called.

At step S412, the detected x value of the coordinates is converted to a value of correction coordinates data $X_D$ plus the adjustment value $\alpha$.

At step S413, the corrected coordinates (x, y) obtained by the processing are stored in memory 23 as display coordinates data.

On the other hand, if NO at step S405, a head address $A_Y$ is set at step S417 at which a correction expression corresponding to the correction is stored. At step S418, the numerical value M is substituted in counter $P_2$ for determining to which region in the x axis direction the detected coordinates correspond. At step S419, counter $P_2$ is decremented by one.

At step S420, it is determined whether or not the relational expression of $x<X(P_2)$ is satisfied. If YES at step S420, a relative address $A_{X4}$ from the head address at which the corresponding correction expression is stored in the x axis direction is set at $A_x$.

At step S430, a value of $A_Y$ plus $A_X$ is set at A (correction expression storage address).

At step S431, the adjustment value a for the determined region is calculated. At step S432, the correction expression f(x) stored at address A is called. At step S433, the correction expression f(x) plus the adjustment value $\alpha$ is determined as the corrected coordinates x.

At step S434, the detected coordinates (x, y) obtained by the above described correction processing are stored in memory 23 as display coordinates data.

If NO at step S420, it indicates that a region including the detected coordinates is not the right end of the display region. Therefore, at step S422, counter $P_2$ is decremented by one.

At step S423, it is determined whether or not the relational expression of $x<X(P_2)$ is satisfied. If YES at step S423, it indicates that the region including the detected coordinates is a region positioned opposite to the center of driver IC (for example, 1-(M-1)). Therefore, after a relative address $A_{X2}$ is substituted in the relative address $A_X$ at step S424, the processing from step S430 is carried out.

If NO at step S423, counter $P_2$ is decremented by one at steD S425. At step S426, it is determined whether or not the relational expression of $x<X(P_2)$ is satisfied. If YES at step S426, a relative address AX3 is substituted in $A_X$ at step S427, and the processing from step S430 is carried out.

If NO at step S426, it is determined whether or not the relational expression of $x \geq X$ (1) is satisfied at step S428. If YES at step S426, a relative address $A_{X1}$ is substituted in $A_X$ at step S429 and the processing from step S430 is carried out.

If NO at step S428, the processing from step S422 is carried out.

In the embodiments of the present invention, the correction information is stored in the tablet device. However, the correction information may be externally acquired.

In the third embodiment, an example was described in which correction is carried out by dividing the correction region into the region in which correction is carried out region by region and the region in which correction is carried out by pixel by pixel. However, this embodiment can be applied to the case where correction is carried out only with the region in which correction is carried out region by region.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image input device for detecting, by a voltage applied to a plurality of electrodes included in an indication area of the image input device, a voltage induced in an indicating device indicating at least a part of said indication area to recognize a position indicated by the indicating device, comprising:

memory means for dividing, based on a characteristic of a deviation between a recognized position and an indicated position caused by an arrangement of a plurality of electrodes outside said indication area, an area of the image input device in which said deviation occurs into a plurality of correction regions, each formed in a plurality of pixels, for storage;

acquiring means for acquiring correction information corresponding to a plurality of said correction regions, the acquiring means including:

first means for detecting the row and column coordinates at a rising point when an induced voltage exceeds a predetermined threshold, second means for detecting the row and column coordinates at a falling point when the induced voltage falls below a predetermined threshold, and means for averaging the row and column coordinates detected by the first and second means to determine the row and column coordinate of the induced voltage prior to correction; and correcting means for correcting said recognized position based on the correction information acquired by said acquiring means and corresponding to a correction region including said recognized position, said correction region including a first sub-correction region in which correction is carried out region by region using a mathematical expression, and a second sub-correction region in which correction is carried out pixel by pixel using correction data corresponding to pixels included therein, wherein said correction information includes
mathematical expression information used in said first sub-correction region in which correction is carried out region by region using said mathematical expression, and
pixel-by-pixel correction data used in said second sub-correction region in which correction is carried out pixel-by-pixel using said correction data.

2. The image input device according to claim 1, wherein the deviation between said recognized position and said indicated position in said second correction region, in which correction is carried out pixel by pixel using said correction data, is larger than the deviation between said recognized position and said indicated position in said first correction region in which correction is carried out region by region using said mathematical expression.

3. The image input device according to claim 1, further comprising
storing means for storing the correction information acquired by said acquiring means.

4. The image input device according to claim 3, wherein said storing means stores common correction information used for a plurality of correction regions which are related in a positional relationship between said external electrodes and said correction regions.

5. The image input device according to claim 1, wherein a boundary between said correction regions is set based on the magnitude of said deviation.

6. The image input device of claim 1, wherein the correction information stored in the memory means increases as a distance between the plurality of electrodes and a driving device, for driving the plurality of electrodes, decreases.

7. An integrated input and display device comprising:
a plurality of parallel electrodes arranged in columns;
a plurality of parallel electrodes arranged in rows, wherein a pixel is formed at each intersection of row and column electrodes;
driving means for driving the row and column electrodes; and
coordinate processing means for detecting a voltage induced by an input device contacting said integrated input and display device, said coordinate processing means including:
coordinate detecting means for detecting row and column coordinates of the voltage induced by said input device, said coordinate detecting means including:
first means for detecting the row and column coordinates at a rising point when an induced voltage exceeds a predetermined threshold,
second means for detecting the row and column coordinates at a falling point when the induced voltage falls below the predetermined threshold, and
means for averaging the row and column coordinates detected by the first and second means to determine the row and column coordinates of the induced voltage prior to correction, and
correction processing means for correcting the detected row and column coordinates, the amount of correction increasing as a distance between at least one of the row and column electrodes and the driving means decreases,
wherein the device is segmented into first regions and second regions, each region having a plurality of the pixels, and for the first regions, the correction processing means determines the region of the detected coordinates and then corrects the detected coordinates based upon prestored correction information for the determined region, and
for the second regions, the correction processing means determines the pixel of the detected coordinates and then corrects the detected coordinates based upon prestored correction information for the determined pixel.

8. The integrated input and display device of claim 7, wherein the correction processing means determines the region of the detected coordinates to determine whether or not correction is necessary.

9. The integrated input and display device of claim 8, wherein the correction processing means corrects detected coordinates only in the first or the second regions relatively proximate to the driving means.

10. The integrated input display device of claim 7, further comprising:
a memory for prestoring correction information for at least a plurality of the first or the second regions.

11. The integrated input and display device of claim 7, further comprising:
a memory for prestoring correction information for the first and second regions, the memory storing common correction information used for the first and second regions which are related in a positional relationship between said parallel electrodes and said first and second regions.

12. A method for correctly recognizing a position on an integrated input and display device including a plurality of intersecting row and column electrodes indicated by an indicating device, comprising the steps of:
segmenting the integrated input and display device into first regions and second regions each region having a plurality of pixels;
storing correction amounts for a plurality of the first regions based on the region;
storing correction amounts for each pixel of a plurality of the second regions;
detecting row and column coordinates of a voltage induced by the indicating device contacting the integrated input and display device, each of the row and column coordinates corresponding to a pixel, the detecting step including
detecting row and column coordinates at a rising point when an induced voltage exceeds a predetermined threshold,
detecting row and column coordinates at a falling point when the induced voltage falls below the predetermined threshold, and
averaging the row and column coordinates detected when the induced voltage exceeds and falls below the predetermined threshold, to determine the row and column coordinates of the induced voltage prior to correcting;
determining a region corresponding to the detected voltage as one of the first region and the second region;
correcting the detected row and column coordinates within the first region based upon the stored correction amounts for the determined region, wherein the stored amount of correction increases as a distance between at least one of the row and column electrodes and a driving device, for driving the electrodes of the integrated input and display device, decreases; and
correcting the detected row and column coordinates within the second region based on the stored correction amounts for the determined pixel.

13. The method of claim 12, wherein, for at least one of the first regions, no correction amount is stored, and wherein no correcting of the detected row and column coordinates takes place upon determining that the first region corresponding to the detected voltage corresponds to a first region wherein no correction amount is stored.

14. The method of claim 13, wherein correction of the detected row and column coordinates occurs only in the first or the second regions proximate to the to driving device.

15. The method of claim 12, wherein the step of storing correction amounts, for a plurality of the first regions based on the region, stores common correction information used for the plurality of first regions which are related in a positional relationship between said intersecting row or column electrodes and said first regions.

16. The method of claim 12, wherein the step of storing correction amounts for each pixel of a plurality of the second regions stores common correction information used for the plurality of pixels in the second regions which are related in a positional relationship between said row or column electrodes and said pixels.

* * * * *